US011706276B2

(12) United States Patent
Osborne

(10) Patent No.: US 11,706,276 B2
(45) Date of Patent: *Jul. 18, 2023

(54) SYSTEMS AND METHODS FOR SEEKING WITHIN MULTIMEDIA CONTENT DURING STREAMING PLAYBACK

(71) Applicant: DIVX, LLC, San Diego, CA (US)

(72) Inventor: Roland Osborne, San Francisco, CA (US)

(73) Assignee: DIVX, LLC, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/326,056

(22) Filed: May 20, 2021

(65) Prior Publication Data
US 2021/0273985 A1 Sep. 2, 2021

Related U.S. Application Data

(63) Continuation of application No. 16/565,375, filed on Sep. 9, 2019, now Pat. No. 11,050,808, which is a
(Continued)

(51) Int. Cl.
*G06F 16/71* (2019.01)
*H04L 65/75* (2022.01)
(Continued)

(52) U.S. Cl.
CPC ............ *H04L 65/764* (2022.05); *G06F 16/71* (2019.01); *G06F 16/739* (2019.01);
(Continued)

(58) Field of Classification Search
CPC .............. H04L 65/604; H04L 65/4084; H04L 65/4092; H04L 65/764; H04L 65/612;
(Continued)

(56) References Cited

U.S. PATENT DOCUMENTS 3,609,227 A 9/1971 Kuljian
4,694,491 A 9/1987 Horne et al.
(Continued)

FOREIGN PATENT DOCUMENTS

CA 2237293 A1 7/1997
CA 2306524 A1 9/2001
(Continued)

OTHER PUBLICATIONS

International Standard, Information technology—Generic coding of moving pictures and associated audio information: Systems, ISO/IEC 13818-1:2000(E), Dec. 1, 2000 174 pgs.
(Continued)

*Primary Examiner* — Glenford J Madamba
(74) *Attorney, Agent, or Firm* — KPPB LLP

(57) ABSTRACT

A receiver driven approach for playback of remote content is described. One embodiment includes obtaining information concerning the content of the media file from the remote server, identifying a starting location within the media sequence, identifying byte ranges of the media file corresponding to media required to play the media sequence from the starting location, requesting the byte ranges required to play the media sequence from the starting location, buffering received bytes of information pending commencement of playback, playing back the buffered bytes of information, receiving a user instruction, identifying byte ranges of the media file corresponding to media required to play the media sequence in accordance with the user instruction, flushing previous byte range requests, and requesting the byte ranges required to play the media in accordance with the user instruction.

23 Claims, 9 Drawing Sheets

Related U.S. Application Data continuation of application No. 16/136,149, filed on Sep. 19, 2018, now Pat. No. 10,412,141, which is a continuation of application No. 15/682,379, filed on Aug. 21, 2017, now Pat. No. 10,574,716, which is a continuation of application No. 14/632,670, filed on Feb. 26, 2015, now Pat. No. 9,794,318, which is a continuation of application No. 12/982,413, filed on Dec. 30, 2010, now Pat. No. 8,977,768, which is a continuation of application No. 11/970,493, filed on Jan. 7, 2008, now Pat. No. 7,886,069.

(60) Provisional application No. 60/883,659, filed on Jan. 5, 2007.

(51) Int. Cl.
*G06F 16/738* (2019.01)
*H04N 5/76* (2006.01)
*H04N 5/783* (2006.01)
*H04N 21/234* (2011.01)
*H04N 21/44* (2011.01)
*H04N 21/472* (2011.01)
*H04N 21/6587* (2011.01)
*H04L 65/612* (2022.01)
*H04L 65/613* (2022.01)
*H04N 7/173* (2011.01)

(52) U.S. Cl.
CPC .......... *H04L 65/612* (2022.05); *H04L 65/613* (2022.05); *H04N 5/76* (2013.01); *H04N 5/783* (2013.01); *H04N 7/17318* (2013.01); *H04N 21/23406* (2013.01); *H04N 21/44004* (2013.01); *H04N 21/472* (2013.01); *H04N 21/6587* (2013.01)

(58) Field of Classification Search
CPC ..... H04L 65/613; G06F 16/739; G06F 16/71; H04N 21/472; H04N 7/17318; H04N 21/6587; H04N 21/44004; H04N 21/23406; H04N 5/76; H04N 5/783
See application file for complete search history.

(56) References Cited

U.S. PATENT DOCUMENTS

| | | |
|---|---|---|
| 5,132,992 A | 7/1992 | Yurt et al. |
| 5,341,474 A | 8/1994 | Gelman et al. |
| 5,400,401 A | 3/1995 | Wasilewski et al. |
| 5,477,263 A | 12/1995 | Ocallaghan et al. |
| 5,544,318 A | 8/1996 | Schmitz et al. |
| 5,550,863 A | 8/1996 | Yurt et al. |
| 5,574,785 A | 11/1996 | Ueno et al. |
| 5,600,721 A | 2/1997 | Kitazato |
| 5,614,940 A | 3/1997 | Cobbley et al. |
| 5,621,794 A | 4/1997 | Matsuda et al. |
| 5,630,005 A | 5/1997 | Ort |
| 5,642,338 A | 6/1997 | Fukushima et al. |
| 5,761,417 A | 6/1998 | Henley et al. |
| 5,805,700 A | 9/1998 | Nardone et al. |
| 5,813,010 A | 9/1998 | Kurano et al. |
| 5,828,370 A | 10/1998 | Moeller et al. |
| 5,838,791 A | 11/1998 | Torii et al. |
| 5,852,664 A | 12/1998 | Iverson et al. |
| 5,854,873 A | 12/1998 | Mori et al. |
| 5,874,986 A | 2/1999 | Gibbon et al. |
| 5,878,135 A | 3/1999 | Blatter et al. |
| 5,892,915 A | 4/1999 | Duso et al. |
| 5,907,658 A | 5/1999 | Murase et al. |
| 5,923,869 A | 7/1999 | Kashiwagi et al. |
| 5,973,679 A | 10/1999 | Abbott et al. |
| 6,002,834 A | 12/1999 | Hirabayashi et al. |
| 6,009,237 A | 12/1999 | Hirabayashi et al. |
| 6,016,381 A | 1/2000 | Taira et al. |
| 6,038,316 A | 3/2000 | Dwork et al. |
| 6,057,832 A | 5/2000 | Lev et al. |
| 6,065,050 A | 5/2000 | DeMoney |
| 6,108,422 A | 8/2000 | Newby et al. |
| 6,151,634 A | 11/2000 | Glaser et al. |
| 6,199,107 B1 | 3/2001 | Dujari |
| 6,266,483 B1 | 7/2001 | Okada et al. |
| 6,282,320 B1 | 8/2001 | Hasegawa et al. |
| 6,320,905 B1 | 11/2001 | Konstantinides |
| 6,347,145 B2 | 2/2002 | Kato et al. |
| 6,351,538 B1 | 2/2002 | Uz |
| 6,373,803 B2 | 4/2002 | Ando et al. |
| 6,389,473 B1 | 5/2002 | Carmel et al. |
| 6,415,031 B1 | 7/2002 | Colligan et al. |
| 6,445,877 B1 | 9/2002 | Okada et al. |
| 6,453,115 B1 | 9/2002 | Boyle |
| 6,453,116 B1 | 9/2002 | Ando et al. |
| 6,504,873 B1 | 1/2003 | Vehvilaeinen |
| 6,512,883 B2 | 1/2003 | Shim et al. |
| 6,516,064 B1 | 2/2003 | Osawa et al. |
| 6,535,920 B1 | 3/2003 | Parry et al. |
| 6,578,200 B1 | 6/2003 | Takao et al. |
| 6,594,699 B1 | 7/2003 | Sahai et al. |
| 6,633,688 B1 * | 10/2003 | Nixon .................... G06T 15/20 382/305 |
| 6,654,933 B1 | 11/2003 | Abbott et al. |
| 6,671,408 B1 | 12/2003 | Kaku |
| 6,690,838 B2 | 2/2004 | Zhou |
| 6,721,794 B2 | 4/2004 | Taylor et al. |
| 6,724,944 B1 | 4/2004 | Kalevo et al. |
| 6,742,082 B1 | 5/2004 | Lango et al. |
| 6,751,623 B1 | 6/2004 | Basso et al. |
| 6,754,715 B1 | 6/2004 | Cannon et al. |
| 6,810,131 B2 | 10/2004 | Nakagawa et al. |
| 6,813,437 B2 | 11/2004 | Ando et al. |
| 6,871,006 B1 | 3/2005 | Oguz et al. |
| 6,912,513 B1 | 6/2005 | Candelore |
| 6,931,531 B1 | 8/2005 | Takahashi |
| 6,931,543 B1 | 8/2005 | Pang et al. |
| 6,957,350 B1 | 10/2005 | Demos |
| 6,965,646 B1 | 11/2005 | Firestone |
| 6,970,564 B1 | 11/2005 | Kubota et al. |
| 6,983,079 B2 | 1/2006 | Kim |
| 7,006,757 B2 | 2/2006 | Ando et al. |
| 7,007,170 B2 | 2/2006 | Morten |
| 7,020,287 B2 | 3/2006 | Unger |
| 7,023,992 B1 | 4/2006 | Kubota et al. |
| 7,043,021 B2 | 5/2006 | Graunke et al. |
| 7,051,110 B2 | 5/2006 | Hagai et al. |
| 7,058,177 B1 | 6/2006 | Trimberger et al. |
| 7,073,191 B2 | 7/2006 | Srikantan et al. |
| 7,110,542 B1 | 9/2006 | Tripathy |
| 7,120,250 B2 | 10/2006 | Candelore |
| 7,124,303 B2 | 10/2006 | Candelore et al. |
| 7,130,908 B1 | 10/2006 | Pecus et al. |
| 7,139,868 B2 | 11/2006 | Parry et al. |
| 7,143,289 B2 | 11/2006 | Denning et al. |
| 7,143,433 B1 | 11/2006 | Duan et al. |
| 7,151,832 B1 | 12/2006 | Fetkovich et al. |
| 7,167,560 B2 | 1/2007 | Yu |
| 7,188,183 B1 | 3/2007 | Paul et al. |
| 7,203,313 B2 | 4/2007 | England et al. |
| 7,212,726 B2 | 5/2007 | Zetts |
| 7,231,516 B1 | 6/2007 | Sparrell et al. |
| 7,233,669 B2 | 6/2007 | Candelore |
| 7,233,948 B1 | 6/2007 | Shamoon et al. |
| 7,242,772 B1 | 7/2007 | Tehranchi |
| 7,274,861 B2 | 9/2007 | Yahata et al. |
| 7,295,673 B2 | 11/2007 | Grab et al. |
| 7,302,490 B1 | 11/2007 | Gupta et al. |
| 7,315,829 B1 | 1/2008 | Tagawa et al. |
| 7,346,163 B2 | 3/2008 | Pedlow, Jr. et al. |
| 7,349,886 B2 | 3/2008 | Morten et al. |
| 7,349,976 B1 | 3/2008 | Glaser et al. |
| 7,352,956 B1 | 4/2008 | Winter et al. |
| 7,363,647 B1 | 4/2008 | Fakharzadeh |
| 7,376,233 B2 | 5/2008 | Candelore et al. |

(56) References Cited

U.S. PATENT DOCUMENTS

| | | |
|---|---|---|
| 7,382,879 B1 | 6/2008 | Miller |
| 7,397,853 B2 | 7/2008 | Kwon et al. |
| 7,400,679 B2 | 7/2008 | Kwon et al. |
| 7,406,176 B2 | 7/2008 | Zhu et al. |
| 7,418,132 B2 | 8/2008 | Hoshuyama |
| 7,443,449 B2 | 10/2008 | Momosaki et al. |
| 7,457,415 B2 | 11/2008 | Reitmeier et al. |
| 7,499,930 B2 | 3/2009 | Naka et al. |
| 7,539,213 B2 | 5/2009 | Guillemot et al. |
| 7,546,641 B2 | 6/2009 | Robert et al. |
| 7,577,980 B2 | 8/2009 | Kienzle et al. |
| 7,623,759 B2 | 11/2009 | Shimoda |
| 7,624,337 B2 | 11/2009 | Sull et al. |
| 7,627,750 B1 | 12/2009 | Chan |
| 7,627,888 B2 | 12/2009 | Ganesan et al. |
| 7,639,921 B2 | 12/2009 | Seo et al. |
| 7,640,358 B2 | 12/2009 | Deshpande |
| 7,640,435 B2 | 12/2009 | Morten |
| 7,644,172 B2 | 1/2010 | Stewart et al. |
| 7,653,686 B2 | 1/2010 | Yoneda |
| 7,664,872 B2 | 2/2010 | Osborne et al. |
| 7,697,686 B2 | 4/2010 | Puiatti et al. |
| 7,702,925 B2 | 4/2010 | Hanko et al. |
| 7,711,052 B2 | 5/2010 | Hannuksela et al. |
| 7,734,806 B2 | 6/2010 | Park |
| 7,756,270 B2 | 7/2010 | Shimosato et al. |
| 7,756,271 B2 | 7/2010 | Zhu et al. |
| 7,787,622 B2 | 8/2010 | Sprunk |
| 7,797,720 B2 | 9/2010 | Gopalakrishnan et al. |
| 7,840,693 B2 | 11/2010 | Gupta et al. |
| 7,853,980 B2 | 12/2010 | Pedlow, Jr. et al. |
| 7,864,186 B2 | 1/2011 | Robotham et al. |
| 7,877,002 B2 | 1/2011 | Ikeda et al. |
| 7,881,478 B2 | 2/2011 | Derouet |
| 7,885,405 B1 | 2/2011 | Bong |
| 7,886,069 B2 | 2/2011 | Osborne |
| 7,895,311 B1 | 2/2011 | Juenger |
| 7,907,833 B2 | 3/2011 | Lee |
| 7,945,143 B2 | 5/2011 | Yahata et al. |
| 7,962,942 B1 | 6/2011 | Craner |
| 7,970,835 B2 | 6/2011 | St |
| 7,974,714 B2 | 7/2011 | Hoffberg |
| 8,001,471 B2 | 8/2011 | Shaver et al. |
| 8,015,491 B2 | 9/2011 | Shaver et al. |
| 8,073,900 B2 | 12/2011 | Guedalia et al. |
| 8,131,875 B1 | 3/2012 | Chen |
| 8,135,041 B2 | 3/2012 | Ramaswamy |
| 8,160,157 B2 | 4/2012 | Lamy-Bergot et al. |
| 8,169,916 B1 | 5/2012 | Pai et al. |
| 8,170,210 B2 | 5/2012 | Manders et al. |
| 8,213,607 B2 | 7/2012 | Rose et al. |
| 8,213,768 B2 | 7/2012 | Morioka et al. |
| 8,218,439 B2 | 7/2012 | Deshpande |
| 8,243,924 B2 | 8/2012 | Chen et al. |
| 8,286,213 B2 | 10/2012 | Seo |
| 8,311,094 B2 | 11/2012 | Kamariotis et al. |
| 8,312,079 B2 | 11/2012 | Newsome et al. |
| 8,369,421 B2 | 2/2013 | Kadono et al. |
| 8,380,041 B2 | 2/2013 | Barton et al. |
| 8,397,265 B2 | 3/2013 | Henocq et al. |
| 8,438,297 B1 * | 5/2013 | Chen .................. H04L 65/60 709/236 |
| 8,472,792 B2 | 6/2013 | Butt et al. |
| 8,514,926 B2 | 8/2013 | Ro et al. |
| 8,526,610 B2 | 9/2013 | Shamoon et al. |
| 8,543,842 B2 | 9/2013 | Ginter et al. |
| 8,555,329 B2 | 10/2013 | Fröjdh et al. |
| 8,571,993 B2 | 10/2013 | Kocher et al. |
| 8,649,669 B2 | 2/2014 | Braness et al. |
| 8,650,599 B2 | 2/2014 | Shindo et al. |
| 8,683,066 B2 | 3/2014 | Hurst et al. |
| 8,731,369 B2 | 5/2014 | Li et al. |
| 8,782,268 B2 | 7/2014 | Pyle et al. |
| 8,818,896 B2 | 8/2014 | Candelore |
| 8,819,116 B1 | 8/2014 | Tomay et al. |
| 8,849,950 B2 | 9/2014 | Stockhammer et al. |
| 8,977,768 B2 | 3/2015 | Osborne |
| 9,015,782 B2 | 4/2015 | Acharya et al. |
| 9,038,116 B1 | 5/2015 | Knox et al. |
| 9,038,121 B2 | 5/2015 | Kienzle et al. |
| 9,485,469 B2 | 11/2016 | Kahn et al. |
| 9,615,061 B2 | 4/2017 | Carney et al. |
| 9,674,254 B2 | 6/2017 | Pare et al. |
| 9,761,274 B2 | 9/2017 | Delpuch et al. |
| 9,794,318 B2 | 10/2017 | Osborne |
| 9,967,521 B2 | 5/2018 | Kahn et al. |
| 10,171,873 B2 | 1/2019 | Krebs |
| 10,412,141 B2 | 9/2019 | Osborne |
| 10,574,716 B2 | 2/2020 | Osborne |
| 11,050,808 B2 | 6/2021 | Osborne |
| 2001/0021276 A1 | 9/2001 | Zhou |
| 2001/0052077 A1 | 12/2001 | Fung et al. |
| 2001/0052127 A1 | 12/2001 | Seo et al. |
| 2001/0053222 A1 | 12/2001 | Wakao et al. |
| 2002/0048450 A1 | 4/2002 | Zetts |
| 2002/0067432 A1 | 6/2002 | Kondo et al. |
| 2002/0075572 A1 | 6/2002 | Boreczky et al. |
| 2002/0107802 A1 | 8/2002 | Philips |
| 2002/0114330 A1 | 8/2002 | Cheung et al. |
| 2002/0135607 A1 | 9/2002 | Kato et al. |
| 2002/0138619 A1 | 9/2002 | Ramaley et al. |
| 2002/0141503 A1 | 10/2002 | Kobayashi et al. |
| 2002/0154779 A1 | 10/2002 | Asano et al. |
| 2002/0161797 A1 | 10/2002 | Gallo et al. |
| 2002/0164024 A1 | 11/2002 | Arakawa et al. |
| 2002/0169926 A1 | 11/2002 | Pinckney et al. |
| 2002/0169971 A1 | 11/2002 | Asano et al. |
| 2003/0002577 A1 | 1/2003 | Pinder |
| 2003/0043847 A1 | 3/2003 | Haddad |
| 2003/0044080 A1 | 3/2003 | Frishman et al. |
| 2003/0051237 A1 | 3/2003 | Sako et al. |
| 2003/0053541 A1 | 3/2003 | Sun et al. |
| 2003/0061369 A1 | 3/2003 | Aksu et al. |
| 2003/0063675 A1 | 4/2003 | Kang et al. |
| 2003/0077071 A1 * | 4/2003 | Lin .................. H04N 21/4325 386/241 |
| 2003/0079222 A1 | 4/2003 | Boykin et al. |
| 2003/0081776 A1 | 5/2003 | Candelore |
| 2003/0135633 A1 | 7/2003 | Dror et al. |
| 2003/0135742 A1 | 7/2003 | Evans |
| 2003/0142594 A1 | 7/2003 | Tsumagari et al. |
| 2003/0152224 A1 | 8/2003 | Candelore et al. |
| 2003/0169815 A1 | 9/2003 | Aggarwal et al. |
| 2003/0206717 A1 | 11/2003 | Yogeshwar et al. |
| 2003/0236907 A1 | 12/2003 | Stewart et al. |
| 2004/0001594 A1 | 1/2004 | Krishnaswamy et al. |
| 2004/0003008 A1 | 1/2004 | Wasilewski et al. |
| 2004/0022391 A1 | 2/2004 | Obrien |
| 2004/0028227 A1 | 2/2004 | Yu |
| 2004/0034870 A1 | 2/2004 | Obrien et al. |
| 2004/0037421 A1 | 2/2004 | Truman |
| 2004/0047592 A1 | 3/2004 | Seo et al. |
| 2004/0047607 A1 | 3/2004 | Seo et al. |
| 2004/0049690 A1 | 3/2004 | Candelore et al. |
| 2004/0049694 A1 | 3/2004 | Candelore |
| 2004/0073917 A1 | 4/2004 | Pedlow et al. |
| 2004/0076237 A1 | 4/2004 | Kadono et al. |
| 2004/0081333 A1 | 4/2004 | Grab et al. |
| 2004/0088557 A1 | 5/2004 | Malcolm et al. |
| 2004/0093494 A1 | 5/2004 | Nishimoto et al. |
| 2004/0101059 A1 | 5/2004 | Joch et al. |
| 2004/0101142 A1 | 5/2004 | Nasypny |
| 2004/0107356 A1 | 6/2004 | Shamoon et al. |
| 2004/0213094 A1 | 10/2004 | Suzuki |
| 2004/0243714 A1 | 12/2004 | Wynn et al. |
| 2004/0267952 A1 | 12/2004 | He et al. |
| 2005/0005143 A1 | 1/2005 | Lang et al. |
| 2005/0013494 A1 | 1/2005 | Srinivasan et al. |
| 2005/0063541 A1 | 3/2005 | Candelore |
| 2005/0066063 A1 | 3/2005 | Grigorovitch et al. |
| 2005/0076232 A1 | 4/2005 | Kawaguchi |
| 2005/0102371 A1 | 5/2005 | Aksu |
| 2005/0120132 A1 | 6/2005 | Hutter |
| 2005/0138655 A1 | 6/2005 | Zimler et al. |

(56) References Cited

U.S. PATENT DOCUMENTS

| | | |
|---|---|---|
| 2005/0144468 A1 | 6/2005 | Northcutt |
| 2005/0177741 A1 | 8/2005 | Chen et al. |
| 2005/0190911 A1 | 9/2005 | Pare et al. |
| 2005/0192904 A1 | 9/2005 | Candelore |
| 2005/0198364 A1 | 9/2005 | Val et al. |
| 2005/0207442 A1 | 9/2005 | Zoest et al. |
| 2005/0207578 A1 | 9/2005 | Matsuyama et al. |
| 2005/0216752 A1 | 9/2005 | Hofmeyr et al. |
| 2005/0227773 A1 | 10/2005 | Lu et al. |
| 2005/0243912 A1 | 11/2005 | Kwon et al. |
| 2005/0262257 A1 | 11/2005 | Major et al. |
| 2005/0265555 A1 | 12/2005 | Pippuri |
| 2006/0013568 A1 | 1/2006 | Rodriguez |
| 2006/0026654 A1 | 2/2006 | An et al. |
| 2006/0037057 A1* | 2/2006 | Xu .............. H04N 21/8455 725/90 |
| 2006/0059223 A1 | 3/2006 | Klemets et al. |
| 2006/0093318 A1 | 5/2006 | Cohen et al. |
| 2006/0095472 A1 | 5/2006 | Krikorian et al. |
| 2006/0109856 A1 | 5/2006 | Deshpande |
| 2006/0129909 A1 | 6/2006 | Butt et al. |
| 2006/0161635 A1 | 7/2006 | Lamkin et al. |
| 2006/0165163 A1 | 7/2006 | Burazerovic et al. |
| 2006/0168291 A1 | 7/2006 | van Zoest et al. |
| 2006/0168298 A1 | 7/2006 | Aoki et al. |
| 2006/0174021 A1 | 8/2006 | Osborne et al. |
| 2006/0174026 A1 | 8/2006 | Robinson et al. |
| 2006/0195884 A1 | 8/2006 | van Zoest et al. |
| 2006/0200744 A1 | 9/2006 | Bourke et al. |
| 2006/0210245 A1 | 9/2006 | Mccrossan et al. |
| 2006/0212370 A1 | 9/2006 | Shear et al. |
| 2006/0218251 A1 | 9/2006 | Tanabe |
| 2006/0235883 A1 | 10/2006 | Krebs |
| 2006/0294212 A1 | 12/2006 | Kikkawa et al. |
| 2007/0044010 A1 | 2/2007 | Sull et al. |
| 2007/0047645 A1 | 3/2007 | Takashima |
| 2007/0055982 A1 | 3/2007 | Spilo |
| 2007/0067472 A1 | 3/2007 | Maertens et al. |
| 2007/0083467 A1 | 4/2007 | Lindahl et al. |
| 2007/0083663 A1 | 4/2007 | Tanabe et al. |
| 2007/0106863 A1 | 5/2007 | Bonwick et al. |
| 2007/0157267 A1 | 7/2007 | Lopez-Estrada |
| 2007/0162568 A1 | 7/2007 | Gupta et al. |
| 2007/0162611 A1* | 7/2007 | Yu .............. H04N 21/4325 709/232 |
| 2007/0162981 A1 | 7/2007 | Morioka et al. |
| 2007/0166000 A1 | 7/2007 | Nallur et al. |
| 2007/0180051 A1 | 8/2007 | Kelly et al. |
| 2007/0201502 A1 | 8/2007 | Abramson |
| 2007/0204003 A1 | 8/2007 | Abramson |
| 2007/0204011 A1 | 8/2007 | Shaver et al. |
| 2007/0204115 A1 | 8/2007 | Abramson |
| 2007/0209005 A1 | 9/2007 | Shaver et al. |
| 2007/0220118 A1 | 9/2007 | Loyer |
| 2007/0250536 A1 | 10/2007 | Tanaka et al. |
| 2008/0008455 A1 | 1/2008 | De Lange et al. |
| 2008/0022005 A1 | 1/2008 | Wu et al. |
| 2008/0071838 A1 | 3/2008 | Moriya et al. |
| 2008/0082576 A1 | 4/2008 | Bodin et al. |
| 2008/0086570 A1 | 4/2008 | Dey et al. |
| 2008/0101718 A1 | 5/2008 | Yang et al. |
| 2008/0137847 A1 | 6/2008 | Candelore et al. |
| 2008/0155615 A1 | 6/2008 | Craner et al. |
| 2008/0160911 A1 | 7/2008 | Chou et al. |
| 2008/0168133 A1 | 7/2008 | Osborne |
| 2008/0177793 A1 | 7/2008 | Epstein et al. |
| 2009/0010622 A1 | 1/2009 | Yahata et al. |
| 2009/0013195 A1 | 1/2009 | Ochi et al. |
| 2009/0067367 A1 | 3/2009 | Buracchini et al. |
| 2009/0077143 A1 | 3/2009 | Macy, Jr. |
| 2009/0106082 A1 | 4/2009 | Senti et al. |
| 2009/0132599 A1 | 5/2009 | Soroushian et al. |
| 2009/0178090 A1 | 7/2009 | Oztaskent |
| 2009/0249081 A1 | 10/2009 | Zayas |
| 2009/0282162 A1 | 11/2009 | Mehrotra et al. |
| 2009/0310819 A1 | 12/2009 | Hatano |
| 2010/0142915 A1 | 6/2010 | Mcdermott et al. |
| 2010/0185854 A1 | 7/2010 | Burns et al. |
| 2010/0198943 A1 | 8/2010 | Harrang et al. |
| 2011/0010466 A1 | 1/2011 | Fan et al. |
| 2011/0035517 A1 | 2/2011 | Minnick et al. |
| 2011/0058675 A1 | 3/2011 | Brueck et al. |
| 2011/0083009 A1 | 4/2011 | Shamoon et al. |
| 2011/0096828 A1 | 4/2011 | Chen et al. |
| 2011/0099225 A1 | 4/2011 | Osborne |
| 2011/0103374 A1 | 5/2011 | Lajoie et al. |
| 2011/0135090 A1 | 6/2011 | Chan et al. |
| 2011/0145858 A1 | 6/2011 | Philpott et al. |
| 2011/0158470 A1 | 6/2011 | Martin et al. |
| 2011/0170687 A1 | 7/2011 | Hyodo et al. |
| 2011/0173345 A1 | 7/2011 | Knox et al. |
| 2011/0179185 A1 | 7/2011 | Wang et al. |
| 2011/0197261 A1 | 8/2011 | Dong et al. |
| 2011/0246661 A1 | 10/2011 | Manzari et al. |
| 2011/0296048 A1 | 12/2011 | Knox et al. |
| 2011/0314130 A1 | 12/2011 | Strasman |
| 2012/0005312 A1 | 1/2012 | Mcgowan et al. |
| 2012/0042090 A1 | 2/2012 | Chen et al. |
| 2012/0047542 A1 | 2/2012 | Lewis et al. |
| 2012/0110120 A1 | 5/2012 | Willig et al. |
| 2012/0167132 A1 | 6/2012 | Mathews et al. |
| 2012/0311174 A1 | 12/2012 | Bichot et al. |
| 2012/0331167 A1 | 12/2012 | Hunt |
| 2013/0013803 A1 | 1/2013 | Bichot et al. |
| 2013/0080267 A1 | 3/2013 | McGowan |
| 2014/0140253 A1 | 5/2014 | Lohmar et al. |
| 2014/0149557 A1 | 5/2014 | Lohmar et al. |
| 2015/0172351 A1 | 6/2015 | Osborne |
| 2015/0288530 A1 | 10/2015 | Oyman |
| 2017/0011055 A1 | 1/2017 | Pitts |
| 2017/0353520 A1 | 12/2017 | Osborne |
| 2018/0046949 A1 | 2/2018 | Kahn et al. |
| 2018/0255366 A1 | 9/2018 | Lockett et al. |
| 2019/0020704 A1 | 1/2019 | Osborne |
| 2020/0007601 A1 | 1/2020 | Osborne |

FOREIGN PATENT DOCUMENTS

| | | |
|---|---|---|
| CN | 1575595 A | 2/2005 |
| CN | 1581971 A | 2/2005 |
| CN | 1596403 A | 3/2005 |
| CN | 1801929 A | 7/2006 |
| CN | 10636726 A | 1/2010 |
| CN | 101636726 B | 10/2013 |
| CN | 103559165 A | 2/2014 |
| CN | 103561278 A | 2/2014 |
| CN | 103559165 B | 8/2016 |
| CN | 103561278 B | 4/2017 |
| EP | 1158799 A1 | 11/2001 |
| EP | 1453319 A1 | 9/2004 |
| EP | 1534013 A1 | 5/2005 |
| EP | 1536646 A1 | 6/2005 |
| EP | 1283640 B1 | 10/2006 |
| EP | 2122482 A1 | 11/2009 |
| EP | 2180664 A1 | 4/2010 |
| EP | 2360923 A1 | 8/2011 |
| EP | 2122482 B1 | 11/2018 |
| EP | 3467666 A1 | 4/2019 |
| EP | 3467666 B1 | 3/2021 |
| GB | 2398210 A | 8/2004 |
| JP | H1175178 A | 3/1999 |
| JP | 2003504984 | 2/2003 |
| JP | 2003111048 | 4/2003 |
| JP | 2003111048 A | 4/2003 |
| JP | 2004295568 | 10/2004 |
| JP | 2004362099 | 12/2004 |
| JP | 2005149029 | 6/2005 |
| JP | 2005173241 A | 6/2005 |
| JP | 2005518726 | 6/2005 |
| JP | 2005284041 A | 10/2005 |
| JP | 2005341334 A | 12/2005 |
| JP | 2006074511 A | 3/2006 |
| JP | 4516082 B2 | 5/2010 |
| JP | 2010516123 A | 5/2010 |

(56) References Cited

FOREIGN PATENT DOCUMENTS

| | | |
|---|---|---|
| JP | 2014197879 A | 10/2014 |
| JP | 5894220 B2 | 3/2016 |
| KR | 20040039852 A | 5/2004 |
| KR | 20060030164 A | 4/2006 |
| KR | 20060106250 A | 10/2006 |
| KR | 20060116967 A | 11/2006 |
| KR | 20070020727 A | 2/2007 |
| RU | 2328040 C2 | 6/2008 |
| SG | 153621 | 5/2012 |
| WO | 9424625 A1 | 10/1994 |
| WO | 199800973 A1 | 1/1998 |
| WO | 199834405 A1 | 8/1998 |
| WO | 1998047290 | 10/1998 |
| WO | 2000049762 A2 | 8/2000 |
| WO | 2000049763 A1 | 8/2000 |
| WO | 2001006788 A1 | 1/2001 |
| WO | 200223315 A2 | 3/2002 |
| WO | 2003028293 | 4/2002 |
| WO | 2002035832 A2 | 5/2002 |
| WO | 2002054776 | 7/2002 |
| WO | 2002073437 A1 | 9/2002 |
| WO | 2002087241 A1 | 10/2002 |
| WO | 03046750 A1 | 6/2003 |
| WO | 2003046750 A1 | 6/2003 |
| WO | 2003047262 A2 | 6/2003 |
| WO | 2003061173 A2 | 7/2003 |
| WO | 2003071800 A1 | 8/2003 |
| WO | 2003088665 A1 | 10/2003 |
| WO | 2004012378 A2 | 2/2004 |
| WO | 2004100158 A1 | 11/2004 |
| WO | 2005008385 A2 | 1/2005 |
| WO | 2005015935 A1 | 2/2005 |
| WO | 2005057906 A2 | 6/2005 |
| WO | 2005125214 A2 | 12/2005 |
| WO | 20060045334 A1 | 5/2006 |
| WO | 2007072257 A1 | 6/2007 |
| WO | 2007093923 A1 | 8/2007 |
| WO | 2007101182 A2 | 9/2007 |
| WO | 2008032908 A1 | 3/2008 |
| WO | 2008086313 A1 | 7/2008 |
| WO | 2009006302 A1 | 1/2009 |
| WO | 2009109976 A2 | 9/2009 |
| WO | 2011087449 A1 | 7/2011 |
| WO | 2011101371 A1 | 8/2011 |
| WO | 2011103364 A1 | 8/2011 |

OTHER PUBLICATIONS

Adobe—Development Center: Flash video learning guide, printed Jan. 13, 2009 from http://www.adobe.com/devnet/flash/articles/video_guide_02.html, 5 pgs.
Extended European Search Report for European Application No. 08705745.1, Search completed Dec. 16, 2011, dated Dec. 28, 2011, 09 Pgs.
Extended European Search Report for European Application No. 18206048.3, Search completed Feb. 8, 2019, dated Feb. 21, 2019, 11 Pgs.
Information Technology—MPEG Systems Technologies—Part 7: Common Encryption in ISO Base Media File Format Files (ISO/IEC 23001-7), Apr. 2015, 24 pgs.
International Preliminary Report on Patentability for International Application No. PCT/US2008/050440, Report Completed Aug. 7, 2009, dated Aug. 11, 2009, 8 pgs.
International Search Report for International Application No. PCT/US2008/050440, International Filing Date Jan. 7, 2008, Search completed Apr. 23, 2008, dated May 16, 2008, 2 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision 01.20.03, Dec. 2004, 121 pgs.
MPEG-DASH presentation at Streaming Media West 2011, Nov. 2011, 14 pgs.
Order No. 40: Construing Certain Terms of the Asserted Claims of the Patent at Issue (Markman Claim Construction), Inv. No. 337-TA-1222, Mar. 12, 2021, 97 pgs.
Pomelo, LLC Tech Memo, Analysis of Netflix's Security Framework for 'Watch Instantly' Service, Mar.-Apr. 2009, 18 pgs.
RedOrbit News, New DivX Web Player Hits 1 Milling Downloads in One Week, printed Jan. 13, 2009 from http://www.redorbit.com/modules/news/tools.php?tool=print&id=421307, 2 pgs.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
Vuze HD Network, printed Jun. 1, 2009 from http://www.vuze.com/Index.html, 1 pg.
Written Opinion of international Application No. PCT/US2008/050440 International filing date Jan. 7, 2008, Opinion completed Apr. 23, 2008, dated May 16, 2008, 9 pgs.
"Apple HTTP Live Streaming specification", Aug. 2017, 60 pgs.
"Common Interface Specification for Conditional Access and other Digital Video Broadcasting Decoder Applications", European Standard, EN 50221, Feb. 1997, 86 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Delivering Live and On-Demand Smooth Streaming", Microsoft Silverlight, 2009, 28 pgs. check for duplicate .
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Information Technology—Coding of Audio Visual Objects—Part 2: Visual", International Standard, ISO/IEC 14496-2, Third Edition, Jun. 1, 2004, pp. 1-724, (presented in three parts).
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"OpenDML AVI File Format Extensions Version 1.02", OpenDML AVI MJPEG File Format Subcommittee. Last revision: Feb. 28, 1996. Reformatting: Sep. 1997, 42 pgs.
"Server 'Trick Play' support for MPEG-2 Transport Stream Files", www.live555.com/liveMedia/transport-stream-trick-play.html, 2006, Dec. 31, 2020, 1 pg.
"Single-Encode Streaming for Multiple Screen Delivery", Telestream Wowza Media Systems, 2009, 6 pgs.
"The LIVE555 Media Server", www.live555.com/mediaServer/#about, 2006, printed Dec. 31, 2020, 3 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.

(56) References Cited

OTHER PUBLICATIONS

Abomhara et al., "Enhancing Selective Encryption for H.264/AVC Using Advanced Encryption Standard", International Journal of computer Theory and Engineering, Apr. 2010, vol. 2, No. 2, pp. 223-229.
ADB, "ADB-3800W Datasheet", 2007, 2 pgs.
Agi et al., "An Empirical Study of Secure MPEG Video Transmissions", IEEE, Mar. 1996, 8 pgs., DOI: 10.1109/NDSS.1996.492420.
Alattar et al., A.M., "Improved selective encryption techniques for secure transmission of MPEG video bit-streams", In Proceedings 1999 International Conference on Image Processing (Cat. 99CH36348), vol. 4, IEEE, 1999, pp. 256-260.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Beker et al., "Cipher Systems, The Protection of Communications", 1982, 40 pgs.
Bocharov et al, "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs., (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 17, 2002.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.  check duplicate.
Collet, "Delivering Protected Content, An Approach for Next Generation Mobile Technologies", Thesis, 2010, 84 pgs.
Conklin et al., "Video coding for streaming media delivery on the Internet", IEEE Transactions on Circuits and Systems for Video Technology, Mar. 2001, vol. 11, No. 3, pp. 269-281.
Deshpande et al., "Scalable Streaming of JPEG2000 Images Using Hypertext Transfer Protocol", Multimedia '01: Proceedings of the Ninth ACM International Conference on Multimedia, Oct. 2001, pp. 372-381. https://doi.org/10.1145/500141.500197.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, 2001, 66 pgs.
ETSI, "Digital Video Broadcasting (DVB) Support for use of scrambling and Conditional Access (CA) within digital broadcasting systems", Oct. 1996, 13 pgs.
ETSI, "Digital Video Broadcasting (DVB); Implementation guidelines for the use of Video and Audio Coding in Contribution and Primary Distribution Applications based on the MPEG-2 Transport Stream", ETSI TS 102 154 V1.2.1, May 2004, 73 pgs.

Fahmi et al., "Proxy Servers for Scalable Interactive Video Support", Computer, Sep. 2001, vol. 45, No. 9, pp. 54-60, https://doi.org/10.1109/2.947092.
Fang et al., "Real-time deblocking filter for MPEG-4 systems", Asia-Pacific Conference on Circuits and Systems, Oct. 28-31, 2002, Bail, Indonesia, 4 pgs.
Fecheyr-Lippens, "A Review of HTTP Live Streaming", Jan. 2010, 38 pgs.
Fielding et al., "Hypertext Transfer Protocol—HTTP1.1", check duplicate Network Working Group, RFC 2616, Jun. 1999, 114 pgs.
Fitzek et al., "A Prefetching Protocol for Continuous Media Streaming in Wireless Environments", IEEE Journal on Selected Areas in Communications, Oct. 2001, vol. 19, No. 10, pp. 2015-2028, DOI:10.1109/49.957315.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, 4 pgs.
Ho, "Digital Video Broadcasting Conditional Access Architecture", Report prepared for CS265—Section 2, Fall 2002, Prof Stamp, 7 pgs.
Huang, U.S. Pat. No. 7,729,426, U.S. Appl. No. 11/230,794, filed Sep. 20, 2005.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.
ISMA, "ISMA Encryption and Authentication, Version 1.1, AREA / Task Force: DRM", Internet Streaming Media Alliance, Sep. 15, 2006, pp. 1-64.
ITU-T, "Series J: Cable Networks and Transmission of Television, Sound Programme and Other Multimedia Signals", Technical method for ensuring privacy in long-distance international MPEG-2 television transmission conforming to ITU-T J.89, ITU-T Recommendation J.96, Mar. 2001, 34 pgs.
Jain et al., U.S. Appl. No. 61/522,623, filed Aug. 11, 2011.
Jung et al., "Design and Implementation of an Enhanced Personal Video Recorder for DTV", IEEE Transactions on Consumer Electronics, vol. 47, No. 4, Nov. 2001, 6 pgs.
Kabir, "Scalable and Interactive Multimedia Streaming Over the Internet", Thesis, 2005, 207 pgs.
Kalva, Hari, "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kim et al, "A Deblocking Filter with Two Separate Modes in Block-Based Video Coding", IEEE transactions on circuits and systems for video technology, vol. 9, No. 1, 1999, pp. 156-160.
Kim et al., "Tree-Based Group Key Agreement", Feb. 2004, 37 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
Lian et al., "Selective Video Encryption Based on Advanced Video Coding", PCM, Nov. 2005, Part II, LNCS 3768, pp. 281-290.
Lievaart, "Characteristics that differentiate CA Systems", Irdeto access, Nov. 2001, 5 pgs.
List et al., "Adaptive deblocking filter", IEEE transactions on circuits and systems for video technology, vol. 13, No. 7, Jul. 2003, pp. 614-619.
Lloyd, "Supporting Trick Mode Playback Universally Across the Digital Television Industry", Thesis, 2005, 111 pgs.

(56) References Cited

OTHER PUBLICATIONS

Macaulay et al., "Whitepaper—IP Streaming of MPEG-4: Native RTP vs MPEG-2 Transport Stream", Envivio, Oct. 2005, 12 pgs.
Massoudi et al., "Overview on Selective Encryption of Image and Video: Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Meyer et al., "Security mechanisms for Multimedia-Data with the Example MPEG-I-Video", SECMPEG, 1992, 10 pgs.
Molavi et al., "A Security Study of Digital TV Distribution Systems", Thesis, Jun. 2005, 112 pgs.
NCITS/ISO/IEC, "Information Technology—Generic Coding Of Moving Pictures And Associated Audio Information: Video (Formerly ANSI/ISO/IEC 13818-2-2000)", Second edition, Dec. 15, 2000, 220 pgs.
Nelson, "Smooth Streaming Deployment Guide", Microsoft Expression Encoder, Aug. 2010, 66 pgs.
Nelson, "The Data Compression Book", M&T Publishing, 1992, 533 pgs., (presented in two parts).
Newton et al., "Preserving Privacy by De-identifying Facial Images", Carnegie Mellon University School of Computer Science, Technical Report, CMU-CS-03-119, Mar. 2003, 26 pgs.
O'Brien, U.S. Appl. No. 60/399,846, filed Jul. 30, 2002.
O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Qiao et al., "Comparison of MPEG Encryption Algorithms", Comput. & Graphics, 1998, vol. 22, No. 4, pp. 437-448.
Richardson, "H.264 and MPEG-4 Video Compression", Wiley, 2003, 306 pgs., (presented in two parts).
Senoh et al., "DRM Renewability & Interoperability", IEEE Xplore, Conference: Consumer Communications and Networking Conference, 2004, Feb. 2004, pp. 424-429, DOI: 10.1109/CCNC.2004.1286899, Conference: Consumer Communications and Networking Conference, 2004. CCNC 2004. First IEEE.
Shojania et al., "Experiences with MPEG-4 Multimedia Streaming", CiteSeer, Jan. 2001, 3 pgs., DOI: 10.1145/500141.500221.
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Symes, "Video Compression Demystified", McGraw-Hill, 2001, 353 pgs., (presented in two parts).
Taymans et al., "GStreamer Application Development Manual (1.6.0)", 2007, 159 pgs.
Thomas et al., "A Novel Secure H.264 Transcoder Using Selective Encryption", Proceedings in International Conference on Image Processing, Jan. 2007, vol. 4, pp. IV-85-IV-88, DOI: 10.1109/ICIP.2007.4379960.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Tosun et al., "Efficient multi-layer coding and encryption of MPEG video streams", 2000 IEEE International Conference on Multimedia and Expo. ICME2000. Proceedings. Latest Advances in the Fast Changing World of Multimedia (Cat. No. 00TH8532), Jul. 30-Aug. 2, 2000, pp. 119-122, DOI: 10.1109/ICME.2000.869559.
Trappe et al., "Key Management and Distribution for Secure Multimedia Multicast", IEEE Transaction on Multimedia, vol. 5, No. 4, Dec. 2003, pp. 544-557.
Um, "Selective Video Encryption of Distributed Video Coded Bitstreams and Multicast Security over Wireless Networks", Thesis, Aug. 2006, 142 pgs.
Van Deursen et al., "On Media Delivery Protocols in the Web", 2010 IEEE International Conference on Multimedia and Expo, Jul. 19-23, 2010, 6 pgs.
Ventura, Guillermo Albaida, "Streaming of Multimedia Learning Objects", AG Integrated Communication System, Mar. 2003, 101 pgs.
Waggoner, "Compression for Great Digital Video", 2002, 184 pgs.
Wang, "Lightweight Encryption in Multimedia", Thesis, Jun. 2005, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010.
Wong, "Web Client Programming with Perl", 1997, printed Jan. 8, 2021 from: https://www.oreilly.com/openbook-webclientch03.html, 31 pgs.
Wu, "A Fast MPEG Encryption Algorithm and Implementation of AES on CAM", Thesis, Oct. 6, 2003, 91 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Yuksel, "Partial Encryption of Video for Communication and Storage", Thesis, Sep. 2003, 78 pgs.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
Extended European Search Report for European Application No. 21160147.1, Search completed Aug. 6, 2021, dated Aug. 16, 2021, 5 Pgs.
Summons to Attend Oral Proceedings Pursuant to Rule 115(1) EPC for European Application No. 18206048.3, Dated Jun. 25, 2022, 31 pgs.
Extended European Search Report for European Application No. 22199792.7, Search completed Apr. 14, 2023, dated Apr. 25, 2023, 6 Pgs.
Extended European Search Report for European Application No. 23156805.6, Search completed Apr. 18, 2023, dated May 2, 2023, 7 Pgs.

\* cited by examiner

SYSTEMS AND METHODS FOR SEEKING WITHIN MULTIMEDIA CONTENT DURING STREAMING PLAYBACK

CROSS-REFERENCE TO RELATED APPLICATIONS

The current application is a continuation of U.S. patent application Ser. No. 16/565,375, entitled "Systems and Methods for Seeking Within Multimedia Content During Streaming Playback", filed Sep. 9, 2019, which is a continuation of U.S. patent application Ser. No. 16/136,149, entitled "Systems and Methods for Seeking Within Multimedia Content During Streaming Playback", filed Sep. 19, 2018 and issued as U.S. Pat. No. 10,412,141 on Sep. 10, 2019, which is a continuation of U.S. patent application Ser. No. 15/682,379, entitled "Video Distribution System Including Progressive Playback", filed Aug. 21, 2017 and issued as U.S. Pat. No. 10,574,716 on Feb. 25, 2020, which is a continuation of U.S. patent application Ser. No. 14/632,670, entitled "Video Distribution System Including Progressive Playback", filed Feb. 26, 2015 and issued as U.S. Pat. No. 9,794,318 on Oct. 17, 2017, which is a continuation of U.S. patent application Ser. No. 12/982,413, entitled "Video Distribution System Including Progressive Playback", filed Dec. 30, 2010 and issued as U.S. Pat. No. 8,977,768 on Mar. 10, 2015, which is a continuation of U.S. patent application Ser. No. 11/970,493, entitled "Video Distribution System Including Progressive Playback", filed Jan. 7, 2008 and issued as U.S. Pat. No. 7,886,069 on Feb. 8, 2011, which claims priority to U.S. Provisional Application Ser. No. 60/883,659, entitled "Video Distribution System Including Progressive Playback", filed Jan. 5, 2007, the disclosures of which are incorporated herein by reference.

BACKGROUND

The present invention relates generally to playing multimedia files over a network and more specifically to the progressive playback of multimedia files as they are downloaded over a network.

Progressive playback is the idea of playing back remote content as it is being downloaded. With this feature a user can select a remote movie and commence watching it before it is fully downloaded. Even with a fast Internet connection, waiting for a movie to fully download can range from minutes to hours depending on the size of the media file. With progressive playback a user only has to wait a couple of seconds before playback can begin.

Current implementations of receiver or player driven progressive playback, while suitable for the short video clips that are dominant in many current applications, are typically limited in the scope and flexibility of the progressive playback they provide. Players typically download files linearly from the beginning to the end. Playback then begins when the player has buffered enough data to provide a likelihood that the media will play without interruption. The buffering requirement can either be a fixed amount suitable for a large percentage of content, or a dynamic amount, where the player infers how much data is required to play the entire content without suffering buffer under-run. Although suitable for playback of short video clips, these methods typically do not support random seeking, trick-play and playback of remotely stored longer content such as feature length movies.

Some systems are implemented with a server driven approach. Examples of server driven approaches include the systems described in U.S. patent application Ser. Nos. 11/323,044, 11/323,062, 11/327,543, and 11/322,604, the disclosure of which is incorporated herein by reference in its entirety. In these systems, the server parses the data file and determines which data to send. Network efficiency and flexibility in playback becomes a much easier task. Standard HTTP web servers however do not typically provide this functionality, and custom web servers providing this functionality often scale poorly when called upon to deliver content simultaneously to a large number of players.

Browser based players often implement receiver driven playback by parsing the video file as it is downloaded linearly. When a long clip is started, it is impossible to seek or fast-forward to a point in the file that has not already been downloaded. Samba (open source software available at http://us2.samba.org/samba/) can be used to give any application access to a remote file as if it were a local file. It tries to minimize the access latency by pre-caching data from the current file position, which can be randomly set. This may be insufficient when trying to perform "trick play" functions (e.g. performing functions such as rewinding, fast forwarding and skipping between scenes that require non-sequential access of media content). The video frames to be delivered to the player in these scenarios can be spaced far apart or require more complex ordering, greatly diminishing the utility of traditional pre-caching methods which are based on assumptions regarding the subsequent video frames to be viewed.

SUMMARY OF THE INVENTION

Systems and methods are described for performing progressive playback and "trick play" functions on partially downloaded media files. Many embodiments of the invention include a receiver or player driven system supporting features such as the maintenance at all times of a full capacity download stream of only certain required data, including data in certain byte ranges, the discarding of previous requests, and the issuing of new requests for data at the highest priority. Additionally, several embodiments of the invention include features such as random file access at any point in a file, and asynchronous requests, which provide users flexibility in the playback of a file. In a number of embodiments, the systems and processes support scalability for implementation on Internet servers that store files that can contain multiple titles, titles that include multiple audio tracks, and/or titles that include one or more subtitle tracks.

In several embodiments, the ability to provide full featured progressive playback is due in part to the tight coupling of the playback engine for the media sequence (i.e., the system that decodes and plays back the encoded media) with a transport protocol that provides random access to the remote file. Interfacing of the playback engine with the transport protocol via a file parser can reduce latency and enable the client and media server to operate in parallel improving download efficiency and interactivity. In a number of embodiments, the system and processes are configured for use with files that are formatted to include an index to the data within the file and a transport protocol that allows for downloading specific byte ranges within a file.

One embodiment of the method of the invention includes, obtaining information concerning the content of the media file from the remote server, identifying a starting location within the media sequence, identifying byte ranges of the media file corresponding to media required to play the media sequence from the starting location, requesting the byte ranges required to play the media sequence from the starting location, buffering received bytes of information pending commencement of playback, playing back the buffered bytes of information, receiving a user instruction, identifying byte ranges of the media file corresponding to media required to play the media sequence in accordance with the user instruction, flushing previous byte range requests, and requesting the byte ranges required to play the media in accordance with the user instruction.

A further embodiment of the method of the invention includes, maintaining a mask of the portions of the media file that have been downloaded, identifying that at least a portion of a byte range required to play the media in accordance with the user instruction has already been downloaded using the mask, and requesting only the portions of byte ranges that have not already been downloaded from the media server.

Another embodiment of the method of the invention includes storing downloaded bytes in a data file, and outputting the downloaded media file when all bytes of the media file have been downloaded.

In a still further embodiment of the method of the invention, the data file is a sparse data file.

In still another embodiment of the method of the invention, the media file contains a plurality of media sequences and menu information, and identifying a starting location within the media sequence further includes displaying menu information, receiving a user instruction indicative of the selection of the media sequence, and receiving a user instruction indicative of a starting location within the media sequence.

In a yet further embodiment of the method of the invention, the media sequence includes a plurality of interchangeable audio tracks, identifying a starting location within the media sequence further comprises selecting an audio track, and identifying byte ranges of the media file corresponding to media required to play the media sequence from the starting location further comprises selecting byte ranges that do not include the audio tracks that were not selected.

In yet another embodiment of the method of invention, the media sequence includes a plurality of interchangeable subtitle tracks, identifying a starting location within the media sequence further comprises selecting a subtitle track, and identifying byte ranges of the media file corresponding to media required to play the media sequence from the starting location further includes selecting byte ranges that do not include the subtitle tracks that were not selected.

In a further embodiment again of the method of the invention, the sequence includes key frames, and identifying byte ranges of the media file corresponding to media required to play the media in accordance with the user instruction further includes identifying a sequence of key frames in response to a predetermined user instruction, and identifying byte ranges of the media file corresponding to the identified key frames.

One embodiment of the invention includes a media server, a client, and a network. In addition, the client and the media server are configured to communicate via the network, the client is configured to send requests for at least one portion of the media file to the media server, the server is configured to provide requested portions of the media file to the client, and the client is configured to receive user instructions concerning the playback of the media file and to request portions of the media file that have not been downloaded and that are required to comply with the playback instructions from the media server.

In a further embodiment of the invention, proximate portions of the media file grouped and the groups are requested on an earliest deadline first basis.

In another embodiment of the invention, the client is configured to maintain a queue of requested portions of the media file.

In a still further embodiment of the invention, the client and the server are configured to communicate via at least one connection, and the client is configured to flush the queue of requested portions of the media file and break at least one of the connections in response to the receipt of a predetermined user instruction.

In still another embodiment of the invention, the client is configured to store a file map and a data file, the file map contains a mask indicating the portions of the media file that have been downloaded, and the data file contains the downloaded portions of the media file.

In a yet further embodiment of the invention, the data file is a sparse file.

In yet another embodiment of the invention, the media file includes a media sequence and an index, and the client includes a playback engine configured to obtain the index and determine the portions of the media sequence required to comply with user playback instructions, a file parser configured to use the index to map the portions of the media sequence to portions of the media file and a download manager configured to communicate with the media server to download portions of the media file.

A further embodiment again of the invention includes a user interface configured to receive user instructions, a storage device configured to store at least one media file, a network connection, a download manager configured to asynchronously request at least one byte range of a file from a remotely stored media file via the network connection, a playback engine configured to determine portions of a remotely stored media file that must be downloaded in response to user instructions received via the user interface, and a file parser configured to translate requests for portions of a remotely stored media file to byte ranges and to provide the byte ranges to the download manager.

In another embodiment again of the invention, the download manager is configured to create a status file containing a map of blocks of a media file that have been downloaded, and the download manager is configured to create a data file in which to store blocks of a downloaded media file.

In a further additional embodiment of the invention, the download manager is configured to maintain a queue of requested byte ranges.

In another additional embodiment of the invention, the download manager is configured to flush the queue.

In a still yet further embodiment of the invention, the playback engine is configured to generate a menu using menu information obtained from a remote media file.

In still yet another embodiment of the invention, the playback engine is configured to receive a selection of one of a plurality of media sequences in a remote media file via the menu.

In a still further embodiment again of the invention, the playback engine is configured to receive a selection of one of a plurality of audio tracks for a media sequence in a remote media file via the menu.

In still another embodiment again of the invention, the playback engine is configured to receive a selection of a subtitle track for a media sequence in a remote media file via the menu.

DETAILED DESCRIPTION OF THE INVENTION

Turning now to the drawings, a system for progressively downloading and playing media is shown. In many embodiments, the media is stored in a file on a remote server and a device configured with a client application retrieves portions of the media file and plays the media. The client application typically does not possess the entire media file when it commences playing and can request non-sequential portions of the media file. In this way, the client application can support "trick play" functions. "Trick play" functions impact the playing of a media file such as non-sequential functions including pausing, rewinding, fast forwarding and skipping between scenes. Instead of sequentially downloading a media file and waiting until the required information has been downloaded to perform a "trick play" function, client applications in accordance with embodiments of the invention can determine portions of a media file that are required to support a specific "trick play" function and request those portions of the file from the remote server. When a "trick play" function involves skipping to portions of the media that have not been downloaded, such as fast forwarding and skipping between chapters, latency can be significantly reduced compared to sequential download.

The configuration of a progressive playback system in accordance with an embodiment of the invention can depend upon the container formats supported by the progressive playback system. Examples of container formats include the AVI 1.0 file format specified by Microsoft Corporation of Redmond, Wash., the OpenDML AVI or AVI 2.0 format, container formats similar to the formats specified in U.S. patent application Ser. Nos. 11/016,184 and 11/198,142, the disclosure of which is incorporated herein by reference in its entirety, MPEG-4 Part 15 (MP4) and the open source format known as Matroska (see www.matroska.org). Depending upon the container file format used, a media file can include multiple titles (i.e. media sequences) and each title can include multiple audio tracks and/or one or more subtitle tracks. The container format of a media file influences the manner in which media information within a media file is located. Therefore, the configuration of a progressive playback system is typically determined based upon the container formats supported in a specific application. Although numerous embodiments are discussed below, other variations appropriate to different container formats can be constructed in accordance with embodiments of the invention.

Figure 1:
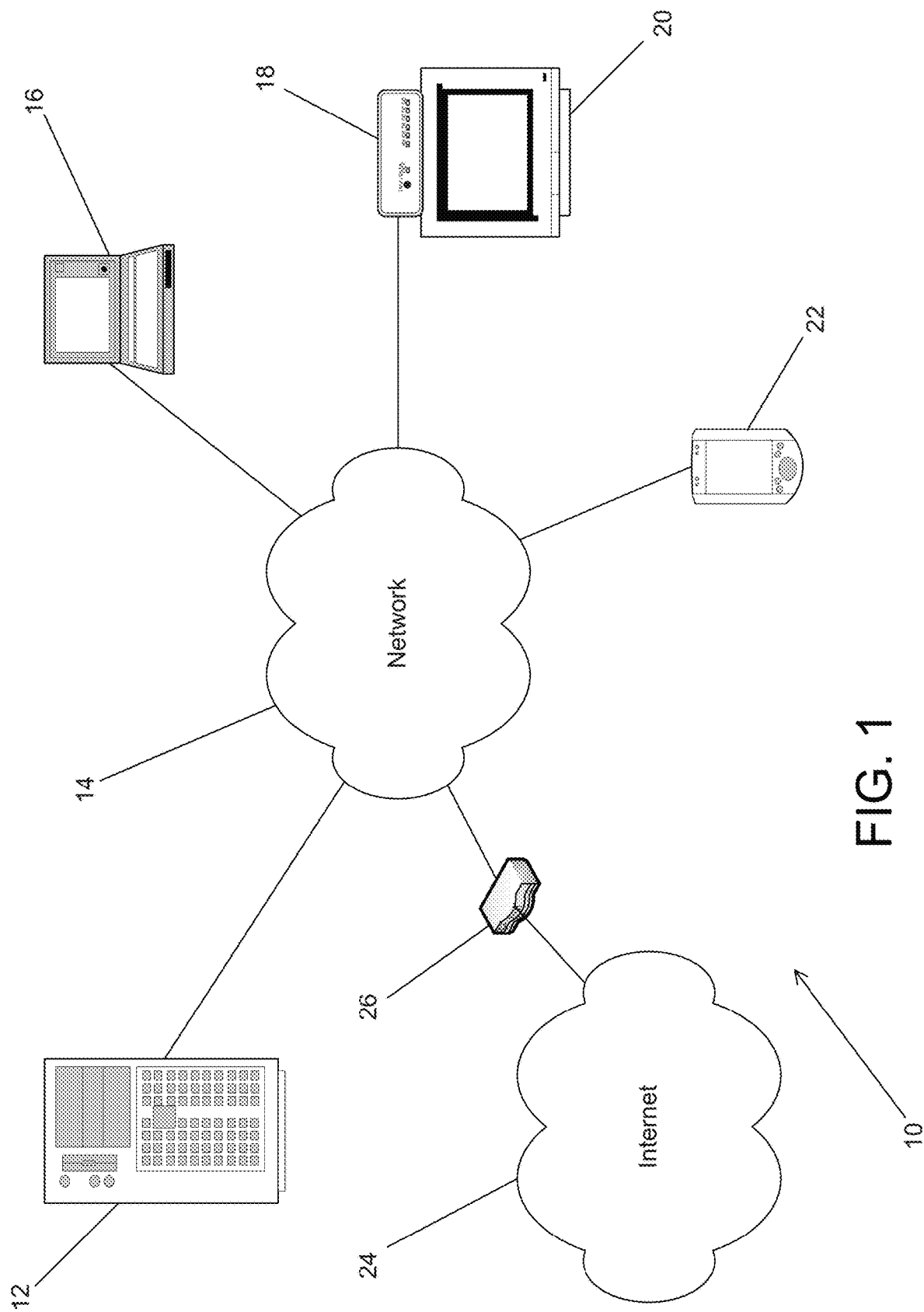
FIG. 1 is a semi-schematic network diagram of progressive playback system in accordance with an embodiment of the invention.

A progressive playback system in accordance with an embodiment of the invention is shown in FIG. 1. The progressive playback system 10 includes a media server 12 connected to a network 14. Media files are stored on the media server 14 and can be accessed by devices configured with a client application. In the illustrated embodiment, devices that access media files on the media server include a personal computer 16, a consumer electronics device such as a set top box 18 connected to a playback device such as a television 20, and a portable device such as a personal digital assistant 22 or a mobile phone handset. The devices and the media server 12 can communicate over a network 14 that is connected to the Internet 24 via a gateway 26. In other embodiments, the media server 14 and the devices communicate over the Internet.

The devices are configured with client applications that can request portions of media files from the media server 12 for playing. The client application can be implemented in software, in firmware, in hardware or in a combination of the above. In many embodiments, the device plays media from downloaded media files. In several embodiments, the device provides one or more outputs that enable another device to play the media. When the media file includes an index, a device configured with a client application in accordance with an embodiment of the invention can use the index to determine the location of various portions of the media. Therefore, the index can be used to provide a user with "trick play" functions. When a user provides a "trick play" instruction, the device uses the index to determine the portion or portions of the media file that are required in order to execute the "trick play" function and requests those portions from the server. In a number of embodiments, the client application requests portions of the media file using a transport protocol that allows for downloading of specific byte ranges within the media file. One such protocol is the HTTP 1.1 protocol published by The Internet Society or BitTorrent available from www.bittorrent.org. In other embodiments, other protocols and/or mechanisms can be used to obtain specific portions of the media file from the media server.

Figure 2:
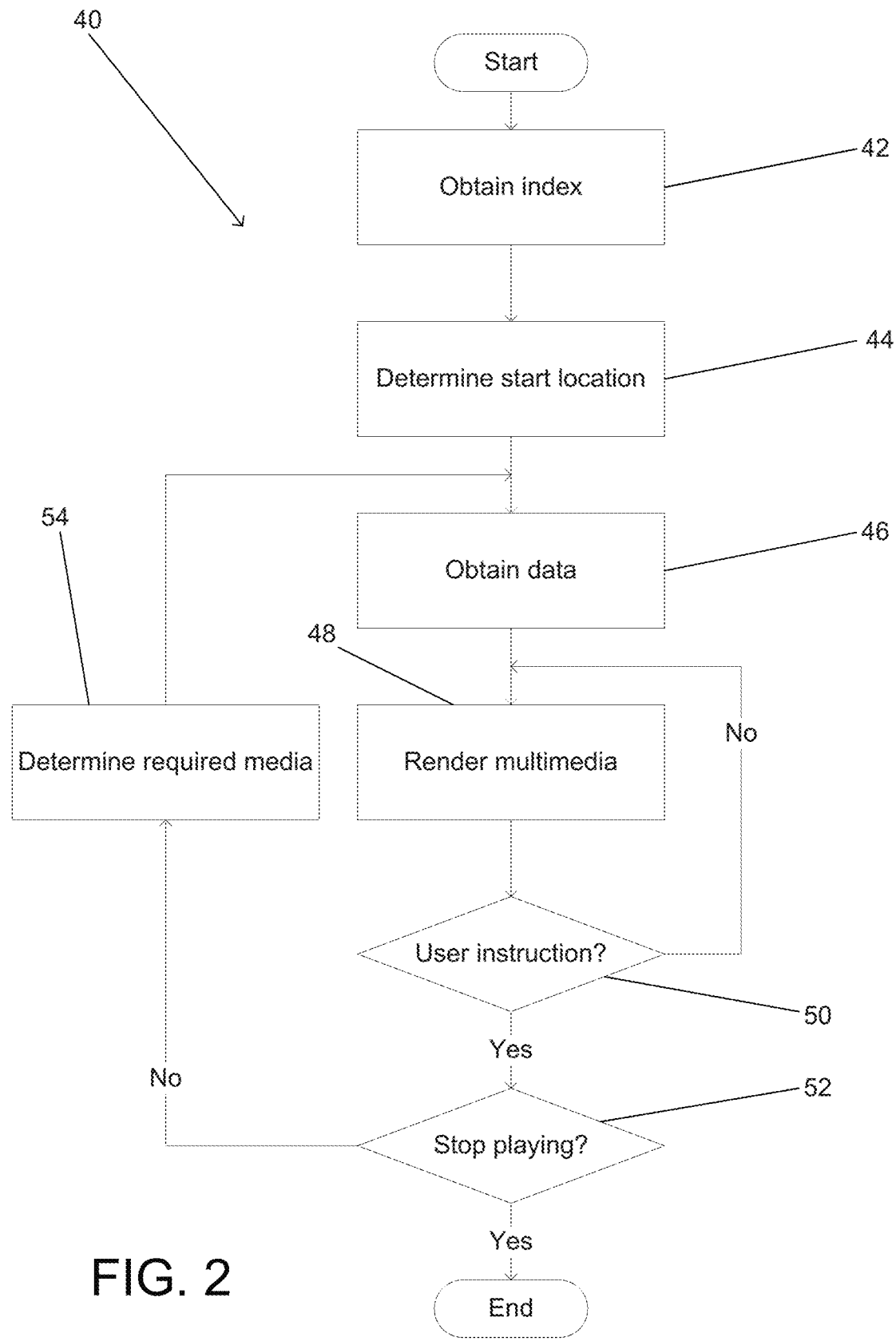
FIG. 2 is a flow chart showing a process for progressively playing back a remotely stored media file in accordance with an embodiment of the invention.

A flow chart showing a process for requesting media from a media server in accordance with an embodiment of the invention is shown in FIG. 2. The process 40 includes obtaining (42) the index of the media file from the media server. A location from which to start playing the media file is then determined (44). In a number of embodiments, all files commence playing at the start of a media sequence. In several embodiments, the media file can include one or more menus that enable a user to select different locations from which to commence viewing one or more media sequences. Once a location has been determined, the media information required to commence playing the media from the determined location is requested (46) and played back (48) upon receipt. The process involves listening (50) for user instructions. In the event that a user does not provide an instruction, the system continues playing the media in accordance with previous instructions received from the user. When a user provides an instruction, the process determines (52) whether the instruction is to cease playing. Otherwise, the process involves determining (54) the media required to comply with the instruction and requesting (46) the required media. The process continues until the user provides an instruction to stop playing the media or the end of the media sequence is reached.

Media servers in accordance with embodiments of the invention can support progressive playback and trick play functions by simply storing media files and receiving requests for specific byte ranges within the media file. The client application can determine the appropriate byte ranges and the media server simply responds to the byte range requests. A client application that is configured to determine appropriate byte ranges in response to user instructions can be implemented in a variety of ways.

Figure 3:
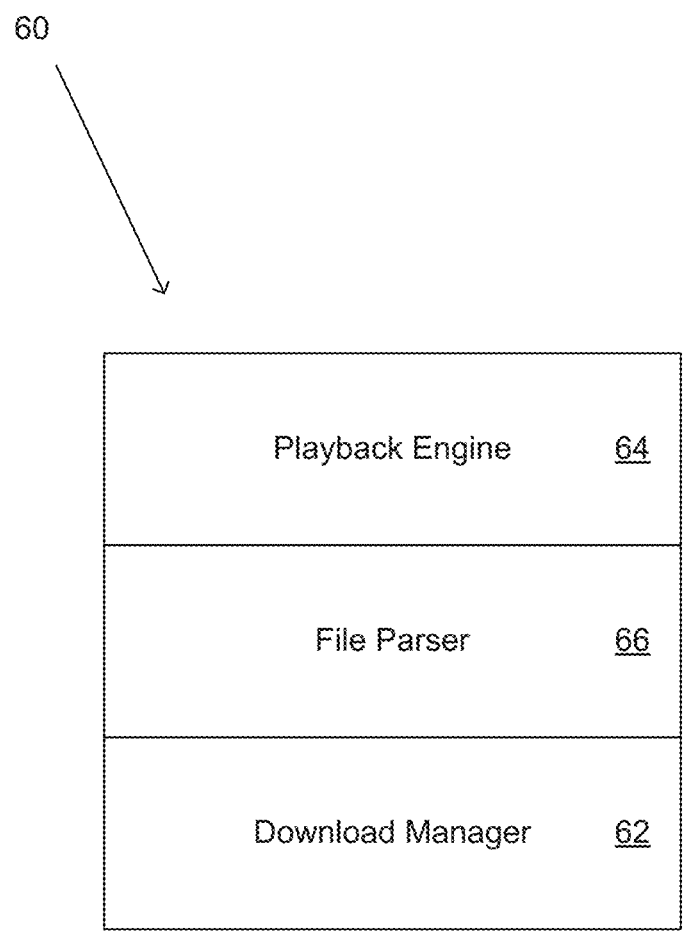
FIG. 3 is a conceptual illustration of a client application configured to request byte ranges from a remote server and to support "trick play" functions in accordance with an embodiment of the invention.

A client application implemented using three abstraction layers in accordance with an embodiment of the invention is illustrated in FIG. 3. The client application 60 includes a download manager 62 that is responsible for coordinating the downloading of specific byte ranges of a file from a remote server. The playback engine 64 is a high level process that coordinates the playback of a media file in response to user interactions. When a media file is being played, the playback engine uses an index of the media file to determine the portions of the media file required to continue playing the media and/or to respond to user instructions. A file parser 66 interfaces between the playback engine 64 and the download manager 62. The file parser maps high level data requests from the playback engine to specific byte ranges that can then be requested using the download manager. The implementation of download managers, file parsers and playback engines in accordance with embodiments of the invention is discussed below. In many embodiments, client applications are configured using alternative architectures that are configured to use an index to a media file to convert user instructions into byte requests that are provided to a remote media server.

Figure 4:
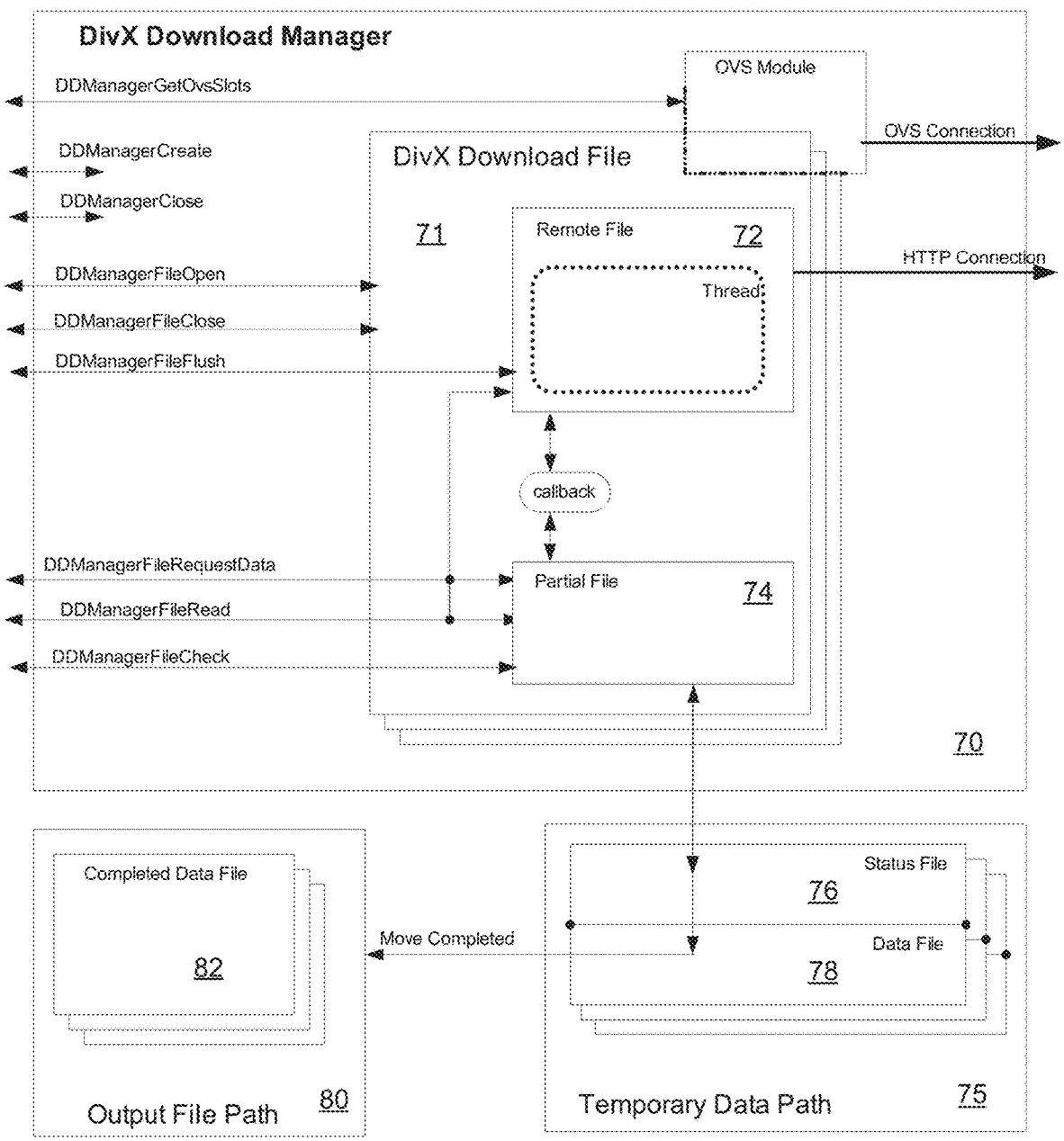
FIG. 4 is a conceptual illustration of a download manager in accordance with an embodiment of the invention.

A download manager in accordance with an embodiment of the invention is illustrated in FIG. 4. As discussed above, the download manager is responsible for communicating with one or more media servers and obtaining specific byte ranges of media from media files stored on the media servers. The download manager 70 shown in FIG. 4 is configured to instantiate a remote file object 72 and a partial file object 74 to assist with the downloading of media files. The remote file object 72 handles the communications associated with requesting byte ranges of a file from a media server and maintains a queue of the byte ranges that have been requested. The partial file object 74 handles storage of the data downloaded from the media server. The partial file object 74 establishes a temporary data path 75 for a file being downloaded by the download manager.

The temporary data path 75 includes a data file 78 and a status file 76. The data file 76 contains data received from the media server. The status file contains a mask of the data file, where each bit within the mask corresponds to a block of fixed size within the data file. As blocks are downloaded, bits within the mask are set. A status file can also include a region for external data, which can include information, such as the last modified server timestamp, that can be used by the download manager to determine if any partially downloaded data has expired. When the entire media file has been downloaded, the download manager creates an output file path 80 and fully downloaded version of the remote file 82 is output to the download path. At which point, the client application can use the local file to play the media and support "trick play" functions in a conventional manner.

Depending upon the size of the file being downloaded, the data file can be several gigabytes in length. A common file allocation approach is to allocate zeros for every byte within the file, which can take several minutes to complete for large files. Latency during data file allocation can be reduced by allocating the file as a sparse file that only uses the number of bytes actually written to the file. When a sparse file is used, the file allocation process requires very little time. In other embodiments, other file allocation approaches can be used that weight latency against the needs of the download manager.

The block size of the data file (as represented in the status file) determines the granularity by which data can be downloaded. A small block size is typically more efficient in terms of downloading only needed bytes. However small block sizes can lead to a large mask size. In many embodiments, a block size of 128 is used to compromise between efficiency and mask size. In other embodiments, other block sizes determined based upon the requirements of the application are utilized.

Figure 5:
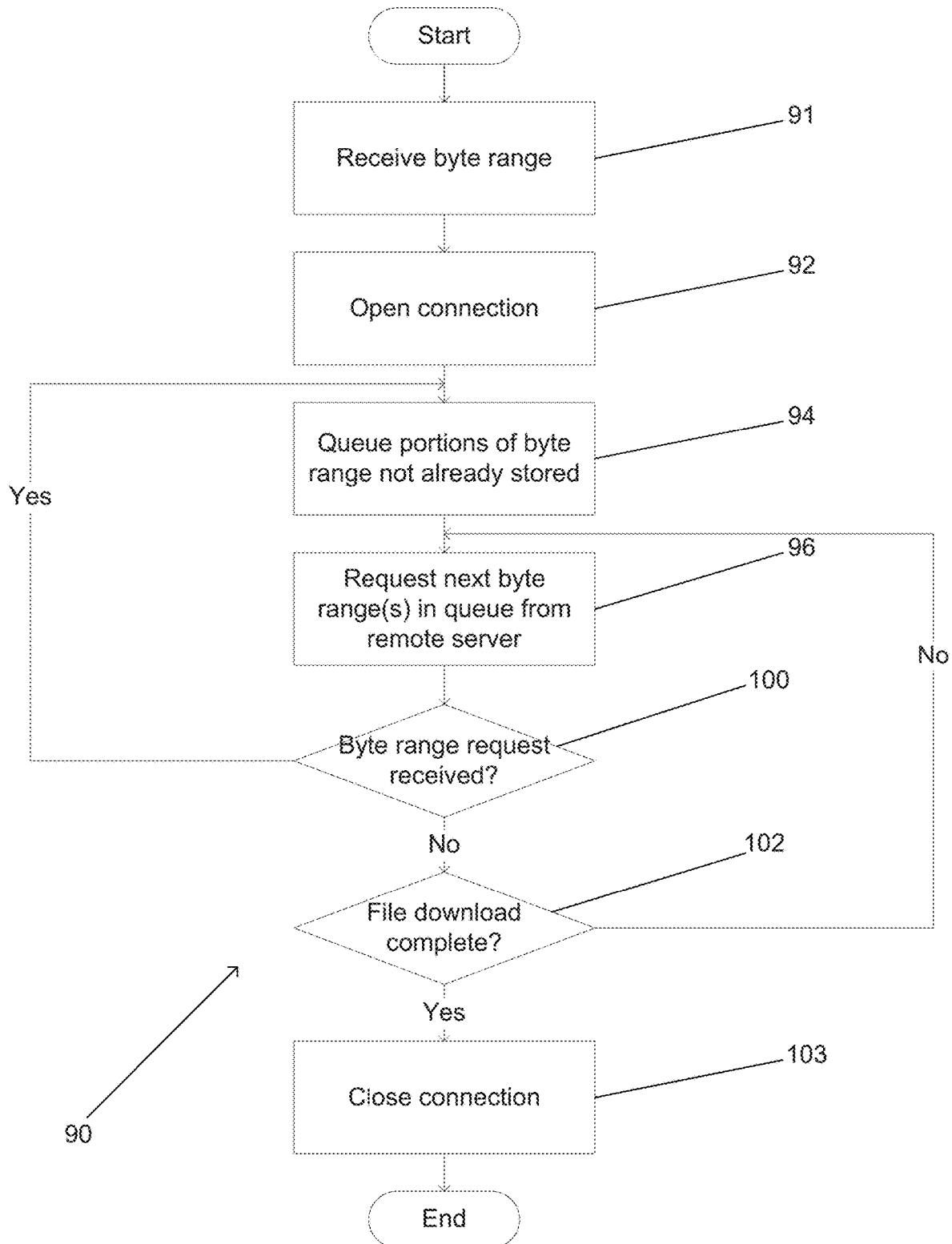
FIG. 5 is a flow chart showing a process for requesting byte ranges from a media server in accordance with an embodiment of the invention.

A process for requesting data using the download manager in accordance with an embodiment of the invention is shown in FIG. 5. The process 90 commences when a request is received (91) to download a byte range from a media file stored on a remote server. When a download manager similar to the download manager shown in FIG. 4 is used, the download manager instantiates a remote file object and a partial file object and creates the necessary supporting files. A connection is established (92) with the remote server, the requested byte range is placed (94) in a request queue and is then requested (96). As more byte ranges are received, the process determines whether any of the bytes within a requested byte range have been previously downloaded and only places portions of the byte range that have not been previously downloaded in the request queue.

When a download manager similar to that shown in FIG. 4 is used to implement the process 90 in FIG. 5, the mask in the status file 76 is used to determine the requested bytes that have already been stored in the data file 78 and the remaining bytes that should be requested. Each byte range request has associated overhead, therefore, a number of embodiments of the invention include multiple byte ranges in a byte range request and/or search the request queue for byte ranges proximate the byte range at the front of the queue and request a large byte range that encompasses all of the proximate byte range. In several embodiments, the process opens multiple connections to increase download data rate and/or accommodate servers that limit the number of byte requests that can be made via a connection. Again, opening connections has associated overhead. Therefore, the number of connections can be limited based upon a limit appropriate to a particular application (e.g. 5).

When a determination (100) is made that there are no more byte ranges in the request queue, the process determines (102) whether the entire file has been downloaded. In the event that the entire file has not been downloaded, the process requests missing bytes from the partially downloaded file object. Once the entire file is downloaded, the downloaded file is exported to its output directory and the connection with the remote server is closed (104) and the process is complete. In many embodiments, the data file is exported only after playback is complete.

Although a specific process for downloading byte ranges is shown in FIG. 5, variations on this process and/or alternative processes that enable the downloading of specific byte ranges and assembly of a data file can be used in accordance with embodiments of the invention. In addition, processes can involve any of a variety of optimizations to minimize the impact of communication overhead on media playback.

When a user provides a "trick play" instruction, previously requested byte ranges may no longer be required in order to continue playing media in the manner instructed by the user. Download managers in accordance with a number of embodiments of the invention possess the ability to flush the queue of pending byte range requests and establish a new queue of byte range requests. An advantage of flushing a request queue is that there is no latency associated with waiting until previously requested byte ranges have been requested prior to downloading the now higher priority byte ranges. In a number of embodiments, closing the connection with the remote server and opening a new connection further reduces latency. Closing the connection can remove latency associated with waiting for the media server to respond to pending download requests prior to the media server responding to new download requests.

Figure 6:
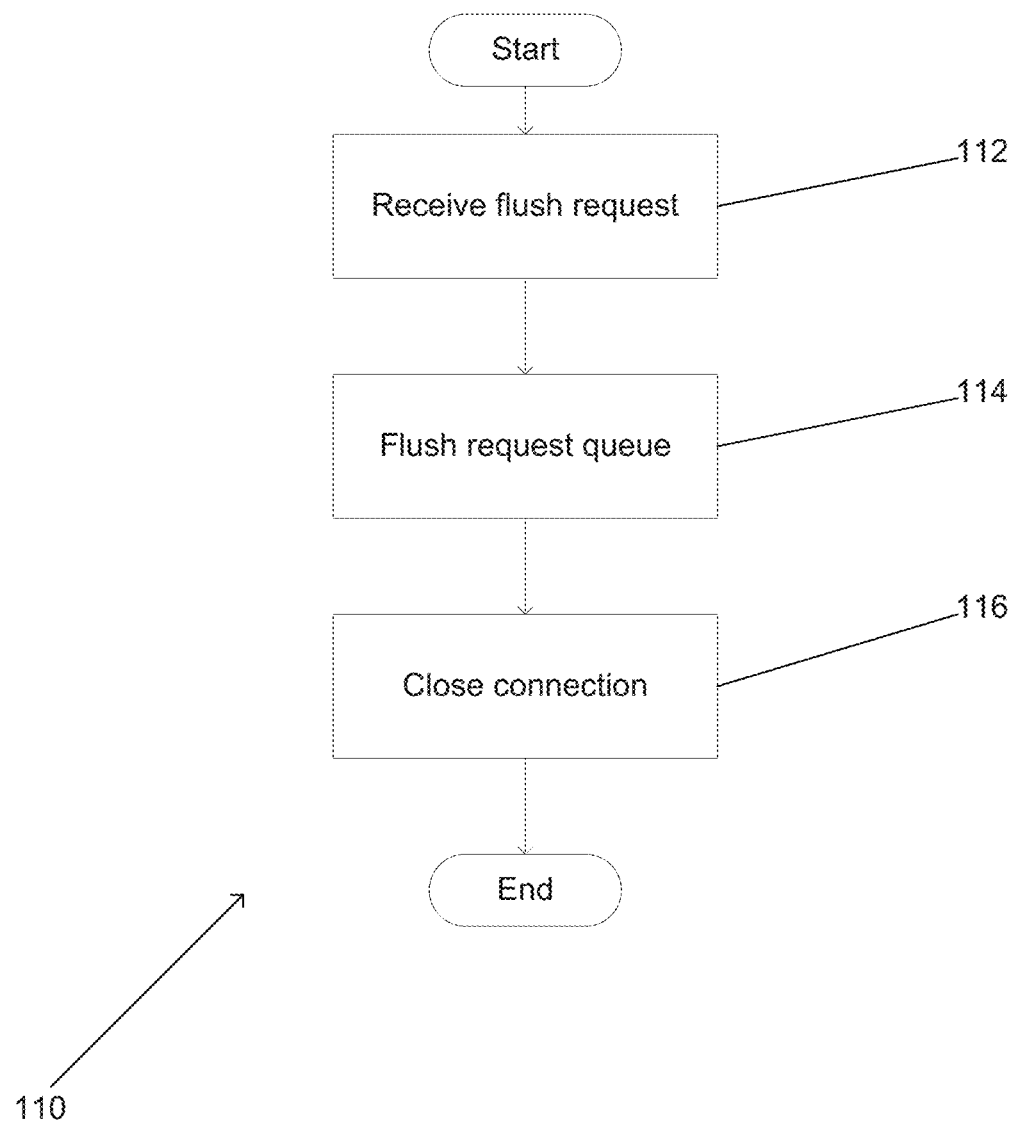
FIG. 6 is a flow chart showing a process for flushing a connection with a media server in accordance with an embodiment of the invention.

A process for flushing a request queue in accordance with an embodiment of the invention is shown in FIG. 6. The process 110 includes receiving (112) a flush request, flushing (114) the request queue and closing (116) the connection with the media server. In many embodiments, other processes can be used to reduce latency when "trick play" requests are received that eliminate the immediate need for portions of a media file previously requested and create an immediate need for portions of a remote media file that have not been previously requested.

Figure 7:
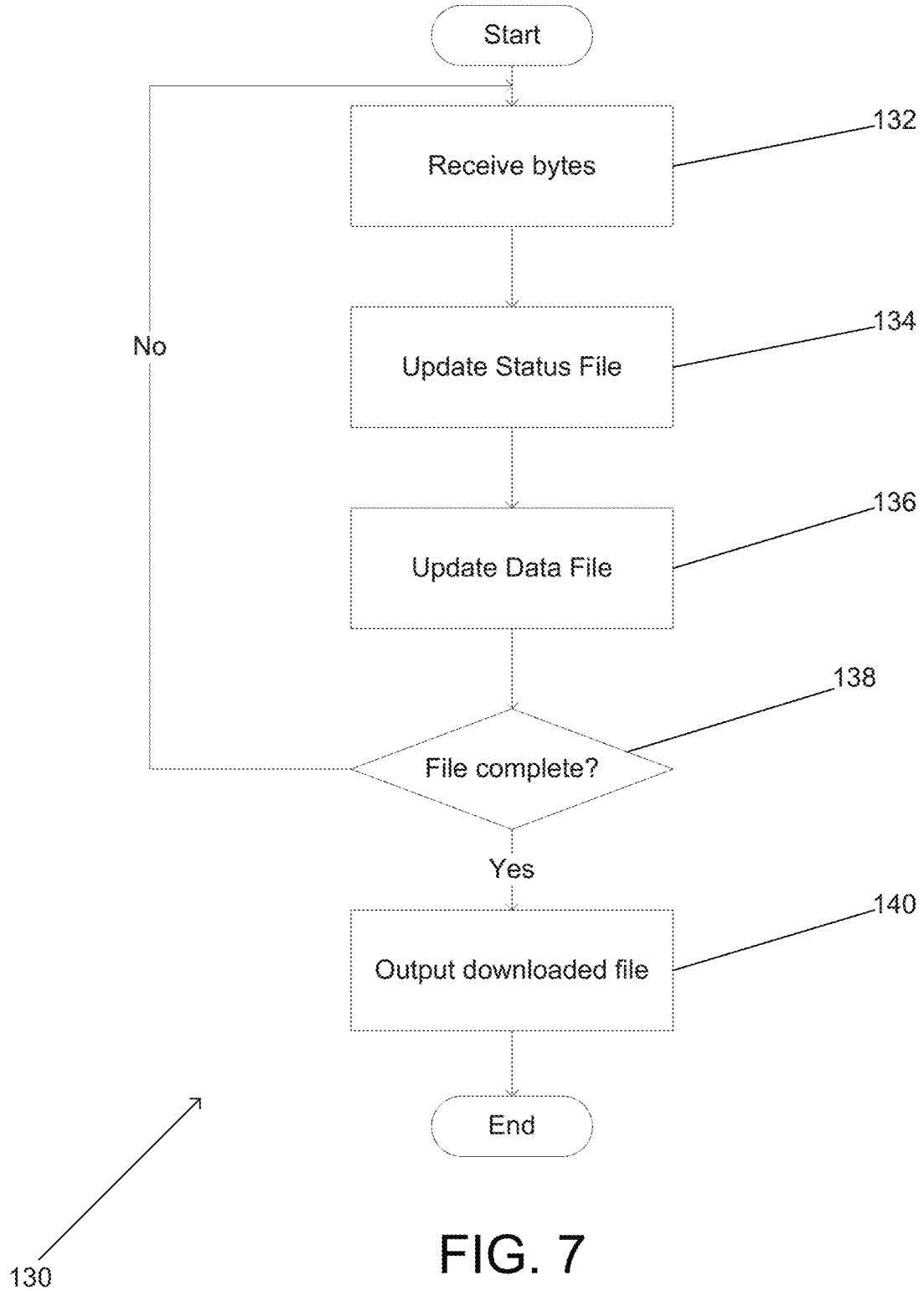
FIG. 7 is a flow chart showing a process for building a data file during the non-sequential downloading of byte ranges of the data file in accordance with an embodiment of the invention.

When data is received by the download manager, the status file and the data file are both updated to reflect the received bytes. A process for handling receiving bytes from a remote media server in accordance with an embodiment of the invention is shown in FIG. 7. The process 130 includes receiving (132) bytes, updating (134) the mask in the status file and updating (136) the data file. A determination (138) is then made as to whether the entire file has been downloaded. In the even that the entire file has not been downloaded, the process waits to receive additional bytes. When the entire file has been downloaded, the downloaded media file is exported (140) to its output directory. In other embodiments, other processes are used to organize received byte ranges.

A file parser in accordance with embodiments of the invention is used to convert high level requests from a playback engine into byte range requests for the download manager and to pass byte ranges downloaded by the download manager to the playback engine. When a device commences progressively playing a media file stored on a remote media server, the file parser accesses the file and downloads information concerning the content of the media file. Media files such as the media files described in U.S. patent application Ser. Nos. 11/016,184 and 11/198,142, incorporated by reference above include menu information and/or information from multiple media sequences (i.e. distinct media presentations). The file parser obtains menu information and information concerning the media sequences. When a media sequence is selected by the user, the file parser obtains an index to the selected media sequence and the index is used to identify the byte ranges within the remote media file to request as the media sequence is played.

Figure 8:
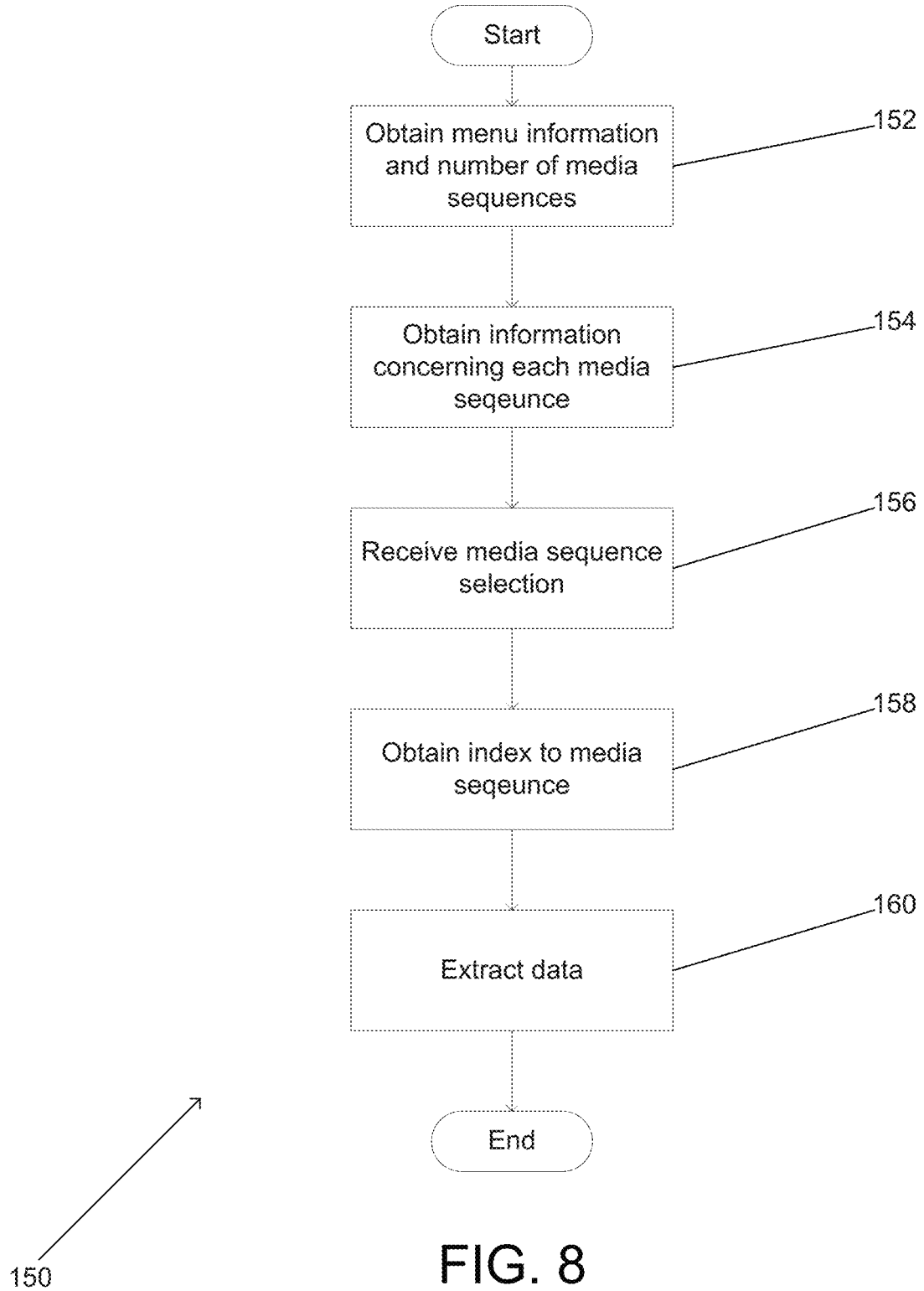
FIG. 8 is a flow chart showing a process that can be used by a file parser to identify menu information and media sequences within a remote media file and to extract information from the file in accordance with an embodiment of the invention.

A process in accordance with an embodiment of the invention for determining the media sequences contained within a remote media file and extracting selected media in accordance with an embodiment of the invention is shown in FIG. 8. The process 150 includes obtaining (152) any menu information contained within the file and information concerning the number of distinct media sequences within the media file. In embodiments where a file parser is used in conjunction with a download manager, the file parser uses knowledge concerning media formats to select bytes of information to request from the media file using the download manager. The menu information and/or the information concerning the number of media sequences can be used to obtain (154) information concerning each of the media sequences. Information that can be useful includes information concerning the title of the media sequence, the format of the media sequence, the number of alternate audio tracks in the media sequence, the presence of one or more subtitle tracks in the media sequence and/or any additional information that could be useful to a user in the selection of a media sequence or to a decoder in the decoding of the media sequence. When the media is formatted in an AVI format or in a format similar to any of the file formats described in U.S. patent application Ser. Nos. 11/016,184 and 11/198, 142, information concerning each of the media sequences can be downloaded by downloading the RIFF header for each media sequence. Once information concerning the media sequences has been obtained, a selection (154) can be made concerning the media sequence that is to be played. When the media file contains a single media sequence, the decision can be automatic. When the media file contains multiple sequences, the decision can be made based upon a user instruction that is obtained via a menu interface generated using menu information obtained from the remote media file by the file parser. The file parser uses the information obtained concerning the media sequence to direct the download manager to download a byte range corresponding to an index (156) for the media sequence. The file parser can use the index to extract (158) data from the remote file. The player engine determines the data that is extracted by the file parser. The manner in which the data is extracted depends upon the format of the media file. When the media file is formatted in a media format that utilizes chunks, the file parser uses the index to convert a chunk reference into specific byte ranges that can be retrieved using the download manager. When other formats are used, the file parser uses byte mappings appropriate to the file descriptive information available to the file parser. In addition to requesting byte ranges, file parsers in accordance with embodiments of the invention can communicate with a download manager to check on the status of a particular request and can provide downloaded bytes to the playback engine.

Figure 9:
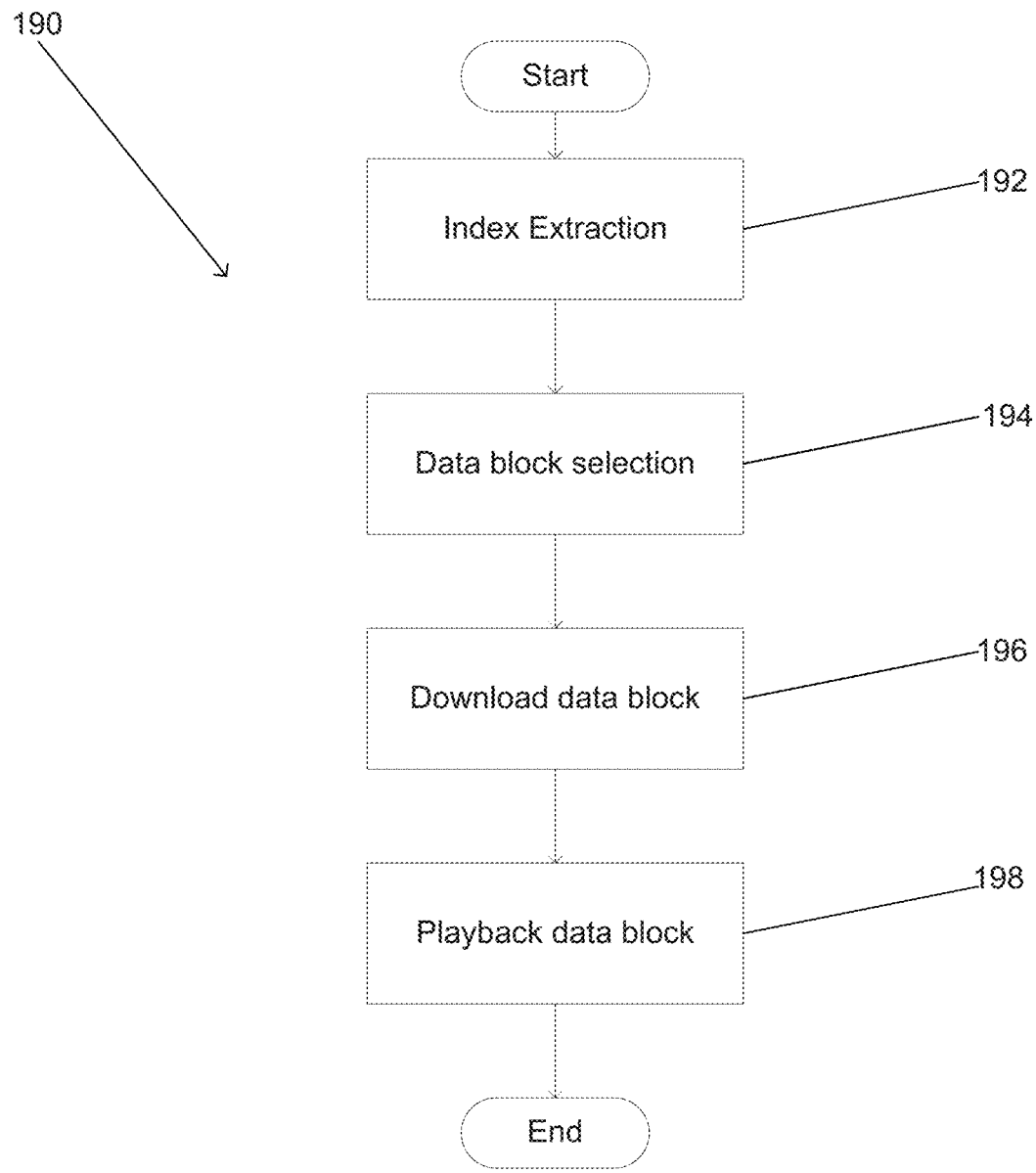
FIG. 9 is a flow chart showing a process used by a playback engine to obtain data chunks from a remote media file formatted using a container format that utilizes chunks in accordance with an embodiment of the invention.

The primary goal of the playback engine, when progressively playing a remote file, is to always maintain a queue of media information required to play the file in the manner requested by the user. When a media file includes an index, the playback engine can refer to the index to determine the media information required to play the media file in the manner requested by the user. A process in accordance with an embodiment of the invention that is used to obtain media from a file that is formatted to represent the media as chunks of information is shown in FIG. 9. The process 190 includes obtaining (192) an index from the remote media file. In embodiments where the playback engine requests information via a file parser, the playback engine can provide an instruction to the file parser to obtain the index and the file parser can extract the necessary information using the download manager. The playback engine then selects (194) chunks based upon instructions, including "trick play" instructions, received from the user and provides instructions to the file parser to download (196) the selected chunks. In a number of embodiments, the playback engine selects chunks based upon an earliest deadline first selection strategy. Chunks from unused audio tracks and unused subtitle tracks multiplexed within the media sequence can be ignored. In many embodiments, media chunks are requested prior to the downloading of the entire index. Media is typically played form the start of a media sequence, therefore, chunks from the start of the media sequence can be downloaded as the index is downloaded. When the playback engine receives the chunks from the file parser, the chunks are queued and provided to an appropriate decoder to enable the playing (198) of the media. Playback of the movie can begin once enough of the movie has been downloaded. The buffered length can be determined by the length of the playback list shared with the chunk download component.

The chunk selection process described above with respect to FIG. 9 maintains a queue of requested chunks. The queue can be maintained as a list of index entries for the requested chunks. The chunk download process polls the download status of the requested chunks. Once downloaded, a chunk is removed from the queue of requested chunks and the downloaded chunk is delivered to the chunk playback process.

When a "trick play" instruction is received, the playback engine selects media information appropriate to the "trick play" instruction. For example, a playback engine that receives a fast-forward or rewind instruction can request only key frames (i.e. complete frames) that are spaced throughout the media sequence at a timing determined by the rate of the trick play function. In many embodiments, the spacing in time is 0.1×the trick frame rate to provide a playback rate during trick play of 10 key frames per second. In other embodiments, various other algorithms are used to determine the media to request. Once the chunks containing the key frames have been identified, the playback engine requests the chunks using the file parser and download manager.

While the above description contains many specific embodiments of the invention, these should not be construed as limitations on the scope of the invention, but rather as an example of one embodiment thereof. Much of the discussion provided above assumes a media file having an index identifying the location of different pieces of media information within the media file. In many embodiments, hierarchical indexes and/or other index formats are included in media files and the playback engine and file parser are configured to accommodate the particular index structure. In several embodiments, the client application is configured to accommodate multiple file formats including file formats that do not possess indexes, but utilize other information to describe the content of the media file. Accordingly, the scope of the invention should be determined not by the embodiments illustrated, but by the appended claims and their equivalents.

What is claimed is:

1. A method of playing back media content using a playback device comprising a processor, memory, and a network connection, the method comprising:
    obtaining, using a file parser, an index to a selected media sequence that is contained within a media file, wherein the playback device comprises a playback client comprising the file parser, a download manager, and a playback engine;
    identifying, using the playback engine, media required to play the media sequence from a starting location;
    converting, using the file parser, the identified media required to play the media sequence from the starting location into at least one byte range of the media file;
    providing, using the file parser, the at least one byte range of the media file to the download manager;
    requesting, using the download manager, the identified media via a network connection of the playback device using the at least one byte range of the media file;
    receiving, using the download manager, the requested media via the network connection of the playback device;
    buffering, using the download manager, the received media pending commencement of playback;
    maintaining, using the download manager, a mask indicating the buffered media;
    playing back, using the playback engine, the buffered media;
    receiving, using the playback engine, a seek instruction via a user interface;
    determining, based on the mask, at least one particular portion of media that has not been buffered at the playback device and that corresponds to media required to play the media sequence in accordance with the seek instruction;
    providing a flush request to the download manager;
    flushing a previous request for a byte range of the media file by closing a connection with a remote server using the download manager in response to the flush request; and
    requesting, from a remote server using the download manager, the determined at least one particular portion of media that has not been buffered at the playback device.

2. The method of claim 1 further comprising maintaining a queue of requested portions of media, wherein flushing the request for the at least one previously requested portion comprises flushing the queue of requested portions of media.

3. The method of claim 1 further comprising storing a file map containing the mask indicating the buffered portions of media and a data file containing the downloaded portions of the media file.

4. The method of claim 3 further comprising:
    storing received portions of media in the data file; and
    outputting the stored data file when all portions of the media file have been downloaded.

5. The method of claim 1 further comprising instantiating a remote file object and a partial file object, wherein:
    the remote file object handles communications associated with requesting portions of media from the remote server and maintains a queue of requested portions; and
    the partial file object handles storage of the portions of media received from the remote server and establishes a temporary data path for a data file for the media sequence.

6. The method of claim 1, wherein the remote server is a standard HTTP server.

7. The method of claim 1, wherein the media for the media sequence is stored in a single file using a container format that utilizes chunks.

8. The method of claim 7, wherein each portion of media corresponds to a chunk, wherein requesting the at least one particular portion of media required to play the media in accordance with the user instruction comprises maintaining a list of index entries for requested chunks.

9. A playback device comprising:
a processor;
a memory; and
a network connection, wherein the memory contains a playback client for causing the processor to perform the steps of:
obtaining, using a file parser, an index to a selected media sequence that is contained within a media file, wherein the playback client comprises the file parser, a download manager, and a playback engine;
identifying, using the playback engine, media required to play the media sequence from a starting location;
converting, using the file parser, the identified media required to play the media sequence from the starting location into at least one byte range of the media file;
providing, using the file parser, the at least one byte range of the media file to the download manager;
requesting, using the download manager, the identified media via the network connection of the playback device using the at least one byte range of the media file;
receiving, using the download manager, the identified media via the network connection of the playback device;
buffering, using the download manager, the received media pending commencement of playback;
maintaining, using the download manager, a mask indicating the buffered media;
playing back, using the playback engine, the buffered media;
receiving, using the playback engine, a seek instruction via a user interface;
determining, based on the mask, at least one particular portion of media that has not been buffered at the playback device and that corresponds to media required to play the media sequence in accordance with the seek instruction;
providing a flush request to the download manager;
flushing a previous request for a byte range of the media file by closing a connection with a remote server using the download manager in response to the flush request; and
requesting, from a remote server using the download manager, the determined at least one particular portion of media that has not been buffered at the playback device.

10. The playback device of claim 9, wherein the steps further comprise maintaining a queue of requested portions of media, wherein flushing the request for the at least one previously requested portion comprises flushing the queue of requested portions of media.

11. The playback device of claim 9, wherein the steps further comprise storing a file map containing the mask indicating the buffered portions of media and a data file containing the downloaded portions of the media file.

12. The playback device of claim 11, wherein the steps further comprise:
storing received portions of media in the data file; and
outputting the stored data file when all portions of the media file have been downloaded.

13. The playback device of claim 9, wherein the steps further comprise instantiating a remote file object and a partial file object, wherein:
the remote file object handles communications associated with requesting portions of media from the remote server and maintains a queue of requested portions; and
the partial file object handles storage of the portions of media received from the remote server and establishes a temporary data path for a data file for the media sequence.

14. The playback device of claim 9, wherein the remote server is a standard HTTP server.

15. The playback device of claim 9, wherein the media for the media sequence is stored in a single file using a container format that utilizes chunks.

16. The playback device of claim 15, wherein each portion of media corresponds to a chunk, wherein requesting the at least one particular portion of media required to play the media in accordance with the user instruction comprises maintaining a list of index entries for requested chunks.

17. A playback device comprising:
a processor;
a memory; and
a network connection, wherein the memory contains a playback client for causing the processor to perform the steps of:
obtaining an index to a selected media sequence using a file parser, wherein the playback client comprises the file parser, a download manager, and a playback engine;
instantiating a remote file object and a partial file object, wherein:
the remote file object handles communications associated with requesting portions of media from a remote server and maintains a queue of requested portions; and
the partial file object handles storage of the portions of media received from the remote server and establishes a temporary data path for a data file for the media sequence;
requesting, using the download manager, portions of media required to play the media sequence from a starting location via the network connection of the playback device;
maintaining a queue of requested portions of media, wherein maintaining the queue comprises flushing the request for at least one previously requested portion upon determining that the at least one previously requested portion of media is no longer required;
receiving, using the download manager, the requested portions of media via the network connection of the playback device;
buffering, using the download manager, the received portions of media pending commencement of playback;
maintaining, using the download manager, a mask indicating the buffered portions of media;
playing back, using the playback engine, at least one of the buffered portions of media;
receiving, using the playback engine, a seek instruction via a user interface;
when at least one previously requested portion of media is no longer required, flushing a request for the at least one previously requested portion of media using the download manager, wherein flushing the request for the at least one previously requested portion comprises closing a connection with a remote server associated with the flushed request;

identifying, using the download manager and based upon the mask, at least one particular portion of media corresponding to media required to play the media sequence in accordance with the seek instruction that has not been buffered at the playback device; and requesting from the remote server, using the download manager, the at least one particular portion of media required to play the media in accordance with the seek instruction.

18. The playback device of claim 17, wherein the steps further comprise identifying the portions of media required to play the media sequence from the starting location based on the obtained index and the identified starting location.

19. The playback device of claim 17, wherein the steps further comprise storing a file map containing the mask indicating the buffered portions of media.

20. The playback device of claim 19, wherein the steps further comprise:

storing received portions of media in the data file; and outputting the stored data file when all portions of the media file have been downloaded.

21. The playback device of claim 17, wherein the remote server is a standard HTTP server.

22. The playback device of claim 17, wherein the media for the media sequence is stored in a single file using a container format that utilizes chunks.

23. The playback device of claim 17, wherein each portion of media corresponds to a chunk, wherein requesting the at least one particular portion of media required to play the media in accordance with the user instruction comprises maintaining a list of index entries for requested chunks.

* * * * *